(12) United States Patent
Wallach et al.

(10) Patent No.: US 11,030,918 B2
(45) Date of Patent: Jun. 8, 2021

(54) IDENTIFICATION AND ANALYSIS OF MOVEMENT USING SENSOR DEVICES

(71) Applicant: Kinetic Telemetry, LLC, Atlanta, GA (US)

(72) Inventors: David Alan Wallach, Atlanta, GA (US); Brian E. Welcher, Atlanta, GA (US); Miles Gantt, Marietta, GA (US); Kyle Carnahan, Atlanta, GA (US)

(73) Assignee: Kinetic Telemetry, LLC, Atlanta, GA (US)

( * ) Notice: Subject to any disclaimer, the term of this patent is extended or adjusted under 35 U.S.C. 154(b) by 1279 days.

(21) Appl. No.: 14/881,499

(22) Filed: Oct. 13, 2015

(65) Prior Publication Data

US 2017/0076619 A1 Mar. 16, 2017

Related U.S. Application Data

(60) Provisional application No. 62/216,487, filed on Sep. 10, 2015.

(51) Int. Cl.
*G09B 19/00* (2006.01)
*A63B 24/00* (2006.01)

(52) U.S. Cl.
CPC ...... *G09B 19/0038* (2013.01); *A63B 24/0003* (2013.01)

(58) Field of Classification Search
CPC .................. G09B 19/0038; A63B 24/0003
(Continued)

(56) References Cited

U.S. PATENT DOCUMENTS 5,221,088 A 6/1993 McTeigue et al.
5,846,086 A * 12/1998 Bizzi .................. A63B 24/0006
434/247

(Continued)

FOREIGN PATENT DOCUMENTS

CA 2780346 A 5/2011
CN 202932930 5/2013
(Continued)

OTHER PUBLICATIONS

Hinge Health (Feb. 8, 2015), https://web.archive.org/web/20150208113019/http://hingehealth.com/.
(Continued)

*Primary Examiner* — Xuan M Thai
*Assistant Examiner* — Sadaruz Zaman
(74) *Attorney, Agent, or Firm* — Thomas Horstemeyer, LLP

(57) ABSTRACT

Disclosed are various embodiments for using sensor devices that include accelerometers and gyroscopes to detect and monitor movement of a body. The sensor devices may be coupled to a body in a predefined arrangement, where a sensor device is positioned on a particular portion of the body in accordance with the predefined arrangement. The sensor devices measure a position of the portion of the body to which the band is secured during movement and communicate the position to a client device to be used in generating and updating a three-dimensional reconstruction of the movement performed in near-real-time. Further, the client device may determine whether the movement performed conforms to a predefined movement and, in response to the movement not conforming to the predefined movement, a suggested change in the movement is identified that, if performed, would conform to the predefined movement.

20 Claims, 11 Drawing Sheets

(58) Field of Classification Search
USPC .......................................................... 434/247
See application file for complete search history.

(56) References Cited

U.S. PATENT DOCUMENTS

| | | | | |
|---|---|---|---|---|
| 6,220,865 | B1* | 4/2001 | Macri | A63B 69/00 434/247 |
| 6,336,891 | B1* | 1/2002 | Fedrigon | A63B 24/0006 434/247 |
| 6,778,866 | B1* | 8/2004 | Bettwy | A63B 24/0006 434/247 |
| 7,758,470 | B2* | 7/2010 | Hirata | A61B 5/1038 434/247 |
| 7,806,806 | B2* | 10/2010 | Jaquish | A63B 24/00 482/8 |
| 7,821,407 | B2* | 10/2010 | Shears | G06F 3/011 340/573.1 |
| 8,280,681 | B2* | 10/2012 | Vock | A43B 3/0005 340/539.26 |
| 8,540,560 | B2* | 9/2013 | Crowley | A63B 24/0062 273/317 |
| 10,213,645 | B1* | 2/2019 | Wu | A63B 71/0622 |
| 10,216,904 | B2 | 2/2019 | Hughes et al. | |
| 2004/0219498 | A1* | 11/2004 | Davidson | A63B 69/00 434/247 |
| 2005/0069853 | A1* | 3/2005 | Tyson | A61B 5/0002 434/247 |
| 2008/0214360 | A1* | 9/2008 | Stirling | A61B 5/1038 482/9 |
| 2009/0005188 | A1* | 1/2009 | Iwatsubo | G06T 7/251 473/223 |
| 2010/0173276 | A1* | 7/2010 | Vasin | A63B 24/0006 434/307 R |
| 2011/0054272 | A1* | 3/2011 | Derchak | A61B 5/02055 600/301 |
| 2011/0117528 | A1 | 5/2011 | Marciello et al. | |
| 2012/0183939 | A1* | 7/2012 | Aragones | A63B 24/0006 434/247 |
| 2012/0277891 | A1* | 11/2012 | Aragones | G06F 19/3481 700/91 |
| 2012/0293557 | A1* | 11/2012 | Hsu | G06F 3/0386 345/672 |
| 2013/0171596 | A1* | 7/2013 | French | G09B 19/00 434/236 |
| 2014/0081182 | A1* | 3/2014 | Klose | A61B 5/0002 600/595 |
| 2014/0147820 | A1* | 5/2014 | Snow | G06K 9/00342 434/247 |
| 2017/0080320 | A1* | 3/2017 | Smith | G16H 40/67 |

FOREIGN PATENT DOCUMENTS

| | | |
|---|---|---|
| WO | 2008018810 | 2/2008 |
| WO | 2015070183 | 5/2015 |

OTHER PUBLICATIONS

Sword Health (Apr. 11, 2015), https://web.archive.org/web/20150411090548/http://www.swordhealth.com.

"How it works", Physitrack (Feb. 20, 2015), https://web.archive.org/web/20150220045756/http://www.physitrack.aom/patients-how-it-works.html.

* cited by examiner

```
// Psuedocode for Sensor Device include <all necessary libraries> float q[4]; // Initiate Quaternion Floats

Create SensorDevice object;

void Setup(){
      SerialPort.Initialize(); // Initialize Serial Port
      Wait(5); // Delay 5 Sec. To Allow Port Initialization;
      SensorDevice.Initialize();
} void loop(){ // Loop To Monitor Data
      // Data Is Obtained That Includes:
      // Sensor ID, quat0, quat1, quat2, and quat3.
      q[0] = Obtain.Quaternion(Sensor_ID); // Obtain Sensor ID
      q[1] = Obtain.Quaternion(quat0); // Obtain First Quaternion
      q[2] = Obtain.Quaternion(quat1); // Obtain Second Quaternion
      q[3] = Obtain.Quaternion(quat2); // Obtain Third Quaternion
      q[4] = Obtain.Quaternion(quat3); // Obtain Fourth Quaternion
      SerialPort.Out(q);
      Wait(0.5);

if Application.Exit=True {
            SerialPort.Close(); // Close Serial Port
            Exit.Loop();
      }
}
```

FIG. 9

```
// Psuedocode for Client Application to Track Motion and Generate
// 3D Reconstruction Include <all necessary libraries>

Initialize screen dimensions;
Initialize BTLE connection;
Initialize variables for rotation matrices;
Initialize OBJModels for body, arm, forearm, hand, etc.;
Set scale parameters;
Initialize Bounding Boxes;

void Setup(){
     Set graphical user interface (GUI) size;
     Load OBJ models for images;
     Scale images;
     Instantiate BoundingBoxes;
     Instantiate BTLE connection;
} void Draw(){
     // Main Loop
     Push orientation matrices for shoulder, arm, hand;
     Rotate orientation matrices by angle and axis of rotation;
     // e.g., Rot(angle, axis[0], axis[1], axis[2]);
     Pop orientation matrices;
     Draw shoulder, arm, hand, body;
} void BTLE_Event(){
     // Called on by the BufferUntil() event
     Determine which sensor sent the data;
         Read bytes in buffer (buf);
     If recording is true
         Save the data;
     If recording was true and is now false
         Export the data to a file;
     ProcessQuats(buf);
} void ProcessQuats(buf) {
     Create String from bytes;
     Parse String for quaternions; // using .split('|')
     ParseFloat(quaternions); // casts string to floats
     Calculate axis for quaternion; // axis[0], axis[1], axis[2]
     Calculate angles for quaternion; //angle return var = (float Angle, float x, float y, float z)
}
```

FIG. 11

IDENTIFICATION AND ANALYSIS OF MOVEMENT USING SENSOR DEVICES

CROSS-REFERENCE TO RELATED APPLICATION

This application claims the benefit of and priority to U.S. Provisional Patent Application No. 62/216,487 entitled "IDENTIFICATION AND ANALYSIS OF MOVEMENT USING SENSOR DEVICES," filed on Sep. 10, 2015, which is incorporated herein by reference in its entirety.

BACKGROUND

Positions and orientations of fixed, rigid bodies, such as a kinematic chain of a robotic manipulator, are tracked using Denavit-Hartenberg convention and other similar methods. However, detecting position and orientation of various parts of a human remain problematic as size and makeup of one body may vary from another. Computer vision is commonly employed to detect movement of person's body. However, computer vision requires an imaging device, such as a camera. Additionally, computer vision requires a system capable of detecting visual identifiers that might not always be accurately detected.

There are various reasons for needing to understand and analyze the movement of a person. In the medical field, screening movement patterns to identify limitations, examine range of motion after an injury, or document historical progression is often needed for diagnosis, aid in treatment, and/or rehabilitation. Traditionally, mobility, stability, and coordination of a patient are assessed by doctors, physical therapists, and/or other qualified healthcare professionals at a medical facility. However, there is a great need to care for individuals in remote areas, where access to specialists can be difficult because of physical, economic, and geographic boundaries. Where distance is not a barrier, often age or disability may make it difficult for an individual to travel to a medical facility for diagnosis or treatment. To provide the best outcome for the patient, improved techniques are sought for both a clinical environment and remote extension.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 9 is an example of pseudocode for reading sensor data according to various embodiments of the present disclosure.

FIG. 11 is an example of pseudocode for processing a sketch according to various embodiments of the present disclosure

DETAILED DESCRIPTION

Figure 1:
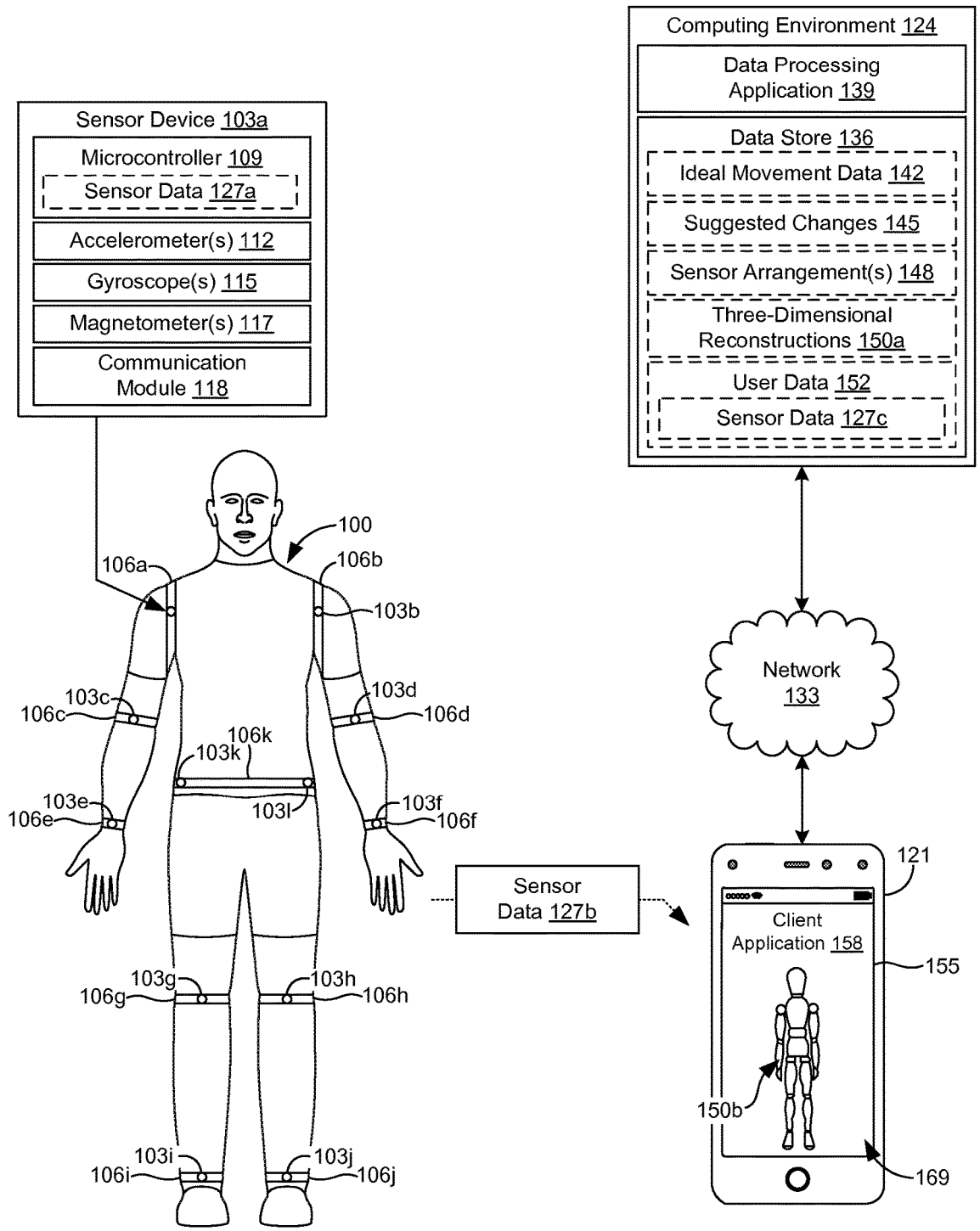
FIG. 1 is a drawing of a networked environment that includes sensor devices positioned on a body, a client device, and a computing environment according to various embodiments of the present disclosure.

The present disclosure relates to using sensors to identify movements, such as body movements performed by a human, animal, humanoid, animoid, or other object capable of performing various types of movements. As noted above, there are various reasons for needing to understand and analyze the movement of a person. In the medical field, screening movement patterns to identify limitations, examine range of motion after an injury, or document historical progression is often needed for diagnosis, aid in treatment, and/or rehabilitation. Traditionally, mobility, stability, and coordination of a patient are assessed by doctors, physical therapists, and/or other qualified healthcare professionals at a medical facility. However, there is a great need to care for individuals in remote areas, where access to a specialist can be difficult because of physical, economic, and geographic boundaries. Where distance is not a barrier, often age or disability may make it difficult for an individual to travel to a medical facility for diagnosis or treatment. To provide the best outcome for the patient, improved techniques are sought for both a clinical environment and remote extension.

Previous technological applications have analyzed movement using digital image processing and computer vision. For example, users may be required to position markers or other visual identifiers on their body, and a camera and computer system tracks the movement when the markers or other visual identifiers are detected and the position has changed from a first frame to a second frame. However, these systems are limited in capability as they are limited to current technologies in digital image processing, require a camera, and the accuracy in detecting body movement is not ideal. For example, it is difficult to identify small movements in various joints, such as the knee.

Accordingly, it is beneficial for a system to be capable of monitoring movement without having to utilize visual analysis. According to various embodiments of the present disclosure, various sensor devices can be positioned on a body of a person, animal, humanoid, animoid, or other moveable body to accurately track movement as will be described. Each sensor device may be coupled to a band or other attachment that secures the sensor device to a position on the body. Additionally, each sensor device may include circuitry that measures a position of the portion of the body to which the band is secured during a movement performed by the portion of the body. In various embodiments, each sensor device may comprise a microcontroller, an accelerometer, a gyroscope, a communication module, and/or other components as may be appreciated.

In one embodiment, at least one of the sensor devices may be dedicated as a "master" sensor device, where other ones of the sensor devices comprise "slave" sensor devices. The slave sensor devices may collect sensor data and communicate the sensor data to the master sensor device. The master sensor device may communicate the sensor data, as well as sensor data collected by the master sensor device itself, to a computing device for processing. In some embodiments, individual sensor devices can independently communicate data to the client device and/or the computing environment. In various embodiments, the computing device comprises a client device, such as a smartphone, a tablet computing device, a laptop computing device, a smartwatch, or other computing device as will be described.

Further, in various embodiments, the sensor devices may be placed in accordance with a predefined arrangement stored in memory, such that a computing device can correlate each of the sensor devices to a respective position of a body. In one embodiment, assuming the body is that of a person, a first sensor device may be positioned at a first shoulder of the body; a second sensor device may be positioned at a second shoulder of the body; a third sensor device may be positioned at a first elbow of the body; a fourth sensor device may be positioned at a second elbow of the body; a fifth sensor device may be positioned at a first wrist of the body; a sixth sensor device may be positioned at a second wrist of the body; a seventh sensor device may be positioned at a first knee of the body; an eighth sensor device may be positioned at a second knee of the body; a ninth sensor device may be positioned at a first ankle of the body; a tenth sensor device may be positioned at a second ankle of the body; an eleventh sensor device may be positioned at a first side of hips of the body; and a twelfth sensor device may be positioned at a second side of hips of the body. As may be appreciated, in alternative embodiments, a lesser amount of sensor devices may be utilized to accurately estimate a position of a portion of a body. For example, position estimation may be improved using a lesser amount of sensor devices based on correlations made between different portions of body parts (e.g., shoulder position based on position of elbow). To this end, other arrangements of sensor devices may be utilized, as applicable. In some embodiments, additional sensors may be located at the forearm, hand, thigh, foot, neck, and/or head to further mark movement. In other embodiments, sensor devices can be attached to an object coupled to the body, such as an artificial limb or other prosthetic; sports equipment, such as a golf club, vaulting pole, baseball bat, etc.; or an object that may decouple from the body, such as a baseball.

As noted above, the sensor devices may include a communication module, such as a Bluetooth® module, a Bluetooth® low-energy module, a ZigBee® module, a near field communication (NFC) module, or other suitable communication module capable of communicating with another computing device. In various embodiments, the sensor devices, or a master sensor device, may be configured to communicate the sensor data to a client device asynchronously. The client device may include a hardware processor, an operating system, and one or more applications (hereinafter client application or client applications) capable of execution on the client device by the hardware processor. In various embodiments, the client application is configured to access the sensor data measured by the sensor devices. The sensor data may include the position of the portion of the body during the movement performed.

In some embodiments, the client application is configured to generate and update a three-dimensional reconstruction of the movement performed for viewing in a display, as will be described. Further, the client application may be configured to determine whether the movement of the body conforms to a predefined movement as well as identify a change in the movement that, if performed, would conform to the predefined movement. In various embodiments, the client application may communicate the sensor data to a remote computing device, such as a server, over a network for remote processing, as will be described.

As will be recognized herein, aspects of the embodiments have far-reaching applications. For example, sensor devices may be used in a clinical setting to identify movements of an individual before and/or after a medical procedure or diagnosis. The data may be used to evaluate the mobility, stability, coordination of a patient, or other diagnostic needs. Another example includes using the systems described herein in telemedicine applications, for example, where a medical professional creates predefined movements, analyzes performed movements, and performs diagnoses and assignments remotely. Another possible use includes sports and sports medicine, where an athlete is evaluated to improve technique or prevent injury. Further examples include employing the systems described herein to monitor movements of humanoid devices, animoid devices, or other robots, for example, to improve gait technique during robotic development. This disclosure is not limited to the medical and sports fields or humans and may be extended to include analysis of animals or other animate systems.

In the following discussion, a general description of the system and its components is provided, followed by a discussion of the operation of the same.

With reference to FIG. 1, shown is a drawing of a body 100 of a person with a plurality of sensor devices 103a . . . 103l (collectively sensor devices 103) positioned thereon. In various embodiments, the sensor devices 103 may be secured to the body 100 using bands 106a . . . 106k (collectively bands 106), such as an elastic band that conforms to movement of the body 100 without detachment. Individual sensor devices 103 may be secured to the band 106, for example, by applying an adhesive to a sensor device 103, affixing the sensor device 103 to the band 106 using Velcro®, positioning the sensor device 103 in a receptacle of the band 106 (e.g., a pouch or a container), sewing the sensor device 103 to the band 106, or applying another suitable affixing technique. In some embodiments, the sensor device may be secured to clothing or adhered directly to the body.

For reference, the components of sensor device 103a are shown in FIG. 1. As noted above, the sensor device 103a may comprise circuitry, such as processing circuitry. In various embodiments, the sensor device 103a may comprise a microcontroller 109, an accelerometer 112, a gyroscope 115, a magnetometer 117, a communication module 118, and/or other components. In further embodiments, the sensor device 103a may comprise other circuitry, such as an altimeter.

The microcontroller 109 may include circuitry, for example, on a single integrated circuit, such as a processor core, memory, and programmable input and output peripherals. To this end, the microcontroller 109 may be preconfigured to control the operations of the components of the sensor device 103a, such as the accelerometer 112, the gyroscope 115, and/or the communication module 118. In some embodiments, the microcontroller 109 performs control operations at the behest of a client device 121 or a computing environment 124, as will be discussed. Further, the microcontroller 109 may be preconfigured to obtain and store sensor data 127a . . . 127c (collectively sensor data 127) in local memory. The sensor data 127a stored locally on the sensor device 103a may include, for example, position data collected from the accelerometer 112, the gyroscope 115, as well as data received by the communication module 118.

The microcontroller 109 may be further configured to determine an orientation and position of the sensor device 103a in a three-dimensional space, or raw sensor data 127a may be communicated to the client device 121 to determine the orientation or position. The gyroscope 115 is configured to measure the rate of change of an angular position of the sensor device 103a over time, also referred to as angular velocity, in a unit of degrees per second. In other words, a gyroscope 115 provides the derivative of the angular position over time:

$$\dot{\theta} = \frac{d\theta}{dt} \qquad (\text{eq. 1})$$

where $\dot{\theta}$ is the metric obtained from the gyroscope 115, i.e., the angular position over time. As the metric obtained from the gyroscope 115 is the derivative of the angular position, the angular position can be calculated by:

$$\theta(t) = \int_0^t \dot{\theta}(t) dt \approx \Sigma_0^t \dot{\theta}(t) T_s \qquad (\text{eq. 2})$$

where θ(t) is the angular position at a given point in time, t, and $T_s$ is a sampling frequency. In various embodiments, the sampling frequency may be between 100 Hz and 200 Hz, although other sampling frequencies may be employed. Sampling frequencies employed between 100 Hz and 200 Hz may be ideal to eliminate errors caused by minor bumps and vibrations.

As the gyroscope 115 in some implementations may have difficulty returning to zero when the sensor device 103a returns to its original position, data from the accelerometer 112 may be utilized. In some embodiments, a filter may be applied to determine an angle for each axis that may be used to ultimately calculate an orientation and position of the sensor device 103a in a three-dimensional space. In some embodiments, a Kalman filter may be employed. In other embodiments, a complimentary filter may be employed where an angle for a given axis may be calculated via:

$$\alpha = 0.98*(\alpha + \text{Data}_{Gyroscope}*dt) + 0.02*(\text{Data}_{Accelerometer}) \qquad (\text{eq. 3})$$

where α is the angle, 0.98 is the gravitational constant, $\text{Data}_{Gyroscope}$ is data from a gyroscope 115, and $\text{Data}_{Accelerometer}$ is data from an accelerometer 112.

In various embodiments, the components of the sensor device 103a are capable of measuring a movement having six-degrees-of-freedom (6DoF) in a three-dimensional space. In other words, each sensor device 103 may monitor changes in its position, such as changes in left movement, right movement, upwards movements, downwards movement, forward movement, backwards movement, pitch, roll, and yaw. To this end, in some embodiments, the sensor device 103a may comprise three accelerometers 112 and three gyroscopes 115.

The communication module 118 includes a network interface component capable of sending and receiving data to other devices. To this end, the communication module 118 may include a Bluetooth® module, a Bluetooth® low-energy module, a ZigBee® module, a wireless fidelity (Wi-Fi) module, a near field communication (NFC) module, or other suitable module. Using the communication module 118, the microcontroller 109 may cause transmission of the sensor data 127a from the sensor device 103a to a computing device, such as the client device 121 (e.g., as sensor data 127b).

A networked environment 130 is also described in accordance with various embodiments. The networked environment 130 may be described as including the sensor devices 103, the computing environment 124, and the client device 121. The computing environment 124 and the client device 121 are in data communication with each other via a network 133. The network 133 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 124 may comprise, for example, a server computer or any other system providing computing capability. Alternatively, the computing environment 124 may employ a plurality of computing devices that may be arranged, for example, in one or more server banks or computer banks or other arrangements. Such computing devices may be located in a single installation or may be distributed among many different geographical locations. For example, the computing environment 124 may include a plurality of computing devices that together may comprise a hosted computing resource, a grid computing resource and/or any other distributed computing arrangement. In some cases, the computing environment 124 may correspond to an elastic computing resource where the allotted capacity of processing, network, storage, or other computing-related resources may vary over time.

Various applications and/or other functionality may be executed in the computing environment 124 according to various embodiments. Also, various data is stored in a data store 136 that is accessible to the computing environment 124. The data store 136 may be representative of a plurality of data stores 136 as can be appreciated. The data stored in the data store 136, for example, is associated with the operation of the various applications and/or functional entities described below.

The components executed on the computing environment 124, for example, include a data processing application 139, and other applications, services, processes, systems, engines, or functionality not discussed in detail herein. Generally, the data processing application 139 is executed to provide remote data services for sensor devices 103 and client devices 121. To this end, in some embodiments, the data processing application 139 is configured to receive and store sensor data 127c from the sensor devices 103 via the client device 121 and perform remote processing on the sensor data 127. In some embodiments, the data processing application 139 may generate or update three-dimensional reconstructions of the body 100 for display in one or more client devices 121. Further, the data processing application 139 may be configured to permit a user to establish or update ideal movement data 142 that may be used to determine, for example, whether a movement of the body 100 conforms to a predefined movement.

In one example, a medical professional may use his or her own batch of sensor devices 103 to remotely define movements assigned to a patient. For example, the medical professional may attach sensor devices 103 to his or her own body and perform a series of movements. The data processing application 139 can monitor the movements performed by the medical professional and store the movements as ideal movement data 142. A patient may access the client application 158 to view the movements prescribed to him or her by the medical professional, e.g., by viewing a three-dimensional reconstruction of the movement. The patient can attempt to perform the movement and the data processing application 139 can determine whether the movement conforms to the ideal movement data 142 created by the medical professional. Accordingly, the medical professional can determine (a) whether the patient has performed his or her assigned movements; (b) whether the movements performed by the user conform to the movement assigned by the medical professional; and (c) if the movement performed by the patient does not conform to the movement assigned by the medical professional, determine why the movement performed by the patient does not conform to the movement assigned by the medical professional.

In addition, the data processing application 139 can identify why movements performed by a user do not conform to ideal movement data 142 and generate suggested changes 145 to the movements that, if performed, might cause the movements to conform to ideal movement data 142.

The data stored in the data store 136 includes, for example, ideal movement data 142, suggested changes 145, sensor arrangements 148, three-dimensional reconstructions 150a . . . 150b (collectively three-dimensional reconstructions 150), user data 152, and potentially other data. The ideal movement data 142 may include sensor data collected during an ideal movement performed by a body 100. For example, a professional basketball player may wear sensor devices 103 while performing a jump shot, a professional baseball player may wear sensor devices 103 while pitching, or a professional pole vaulter may wear sensor devices 103 while performing an ideal jump. Sensor data 127 may be collected during these ideal movements and stored in the data store 136 as ideal movement data 142.

In other embodiments, a user may define ideal movement data 142 to be performed by another user. For example, a medical professional may define ideal movement data 142 for a patient recently having a ulnar collateral ligament reconstruction (UCL) treatment. The ideal movement data 142 may include data collected from sensor devices 103 when the medical professional, or other body 100, performs movements, such as rotating the shoulder up, down, left, and right, simulating a pitching motion, etc. The patient may be assigned the movements to be performed and the actual movements performed by the patient may be compared to the ideal movement data 142.

The suggested changes 145 includes data indicative of why movements performed by a user do not conform to ideal movement data 142 as well as suggested movements that, if performed, might cause the movements to conform to ideal movement data 142. Moving along, sensor arrangements 148 may include one or more predefined arrangements of sensor devices 103 capable of correlating a particular sensor to a particular position on a body 100. An example database table of a predefined arrangement of sensor devices 103 that may be stored in the data store 136 is shown below in Table 1:

TABLE 1

Example Database Table of a
Predefined Arrangement of Sensor Devices 103

| int Sensor_Identifier | var Position | int User_ID |
|---|---|---|
| 012333457 | Left Wrist | 042857 |
| 012333458 | Right Wrist | 042857 |
| 012333459 | Left Elbow | 042857 |
| . . . | . . . | . . . |

As shown above in Table 1, a sensor device 103 may be associated with a sensor identifier, which may include a unique identifier. The database table may be queried using the sensor identifier to identify the position of the corresponding sensor device 103 on the body 100. Further, the sensor identifier may be stored in association with a user identifier, which may include an identifier that uniquely identifies a user of the client device 121, e.g., the wearer of the sensor devices 103. Accordingly, different arrangements of sensor devices 103 may be assigned to different bodies 100, whether persons, animals, humanoids, animoids, etc. In various embodiments, the sensor arrangements 148 may be predefined by a user of the client device 121 (e.g., a wearer of the sensor devices 103) or by another user (e.g., a medical professional, a coach, or other person).

The three-dimensional reconstructions 150 include graphical representations of an electronically generated body performing a movement that may be generated by the client device 121 or the computing environment 124. In various embodiments, the three-dimensional reconstructions 150 may be generated by a three-dimensional model and figure generator in the form of an application, service, or library. In embodiments where an application generates the three-dimensional reconstruction 150 comprises Poser®, MakeHuman™, DAZ 3D, Misfit Model 3D, Mixamo® Fuse, XnaLara Realtime Posing Program, GLLara, or Vizago.

User data 152 may include data corresponding to the wearer of the sensor devices 103 which may be the user of the client device 121. To this end, the sensor data 127c collected during a movement performed by a user may be stored in association with the user as well as a time the movement occurred.

The client device 121 is representative of a plurality of client devices 121 that may be coupled to the network 133. The client device 121 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 121 may include a display 155. The display 155 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 121 may be configured to execute various applications such as a client application 158 and/or other applications. The client application 158 may be executed in a client device 121, for example, to access content served up by the computing environment 124, other servers, and/or the sensor devices 103 to render a user interface 169 on the display 155. To this end, the client application 158 may comprise, for example, a dedicated application, such as a mobile or client application, a web browser, etc., and the user interface 169 may comprise an application screen, a network page, etc. The client device 121 may be configured to execute applications beyond the client application 158 such as, for example, email applications, social networking applications, word processors, spreadsheets, and/or other applications.

Figure 2:
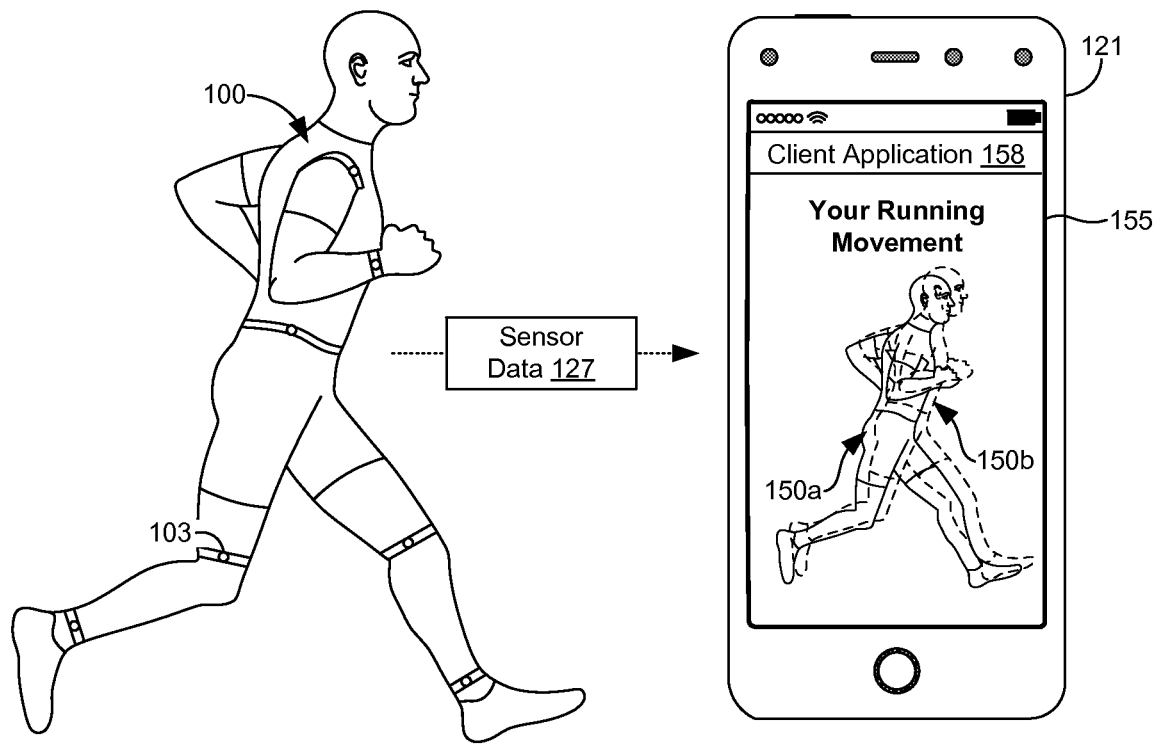
FIG. 2 is a drawing of a body performing a movement where sensor data is used to generate a three-dimensional reconstruction of the movement in the client device of FIG. 1 according to various embodiments of the present disclosure.

Referring next to FIG. 2, shown is a drawing of a body 100 performing a movement where sensor data 127 is collected during the movement and communicated to a client device 121. The client application 158 may be executed in the client device 121 to access and store the sensor data 127. In various embodiments, the client application 158 may be configured to generate a three-dimensional reconstruction 150*a* of the movement in near-real-time as the movement is performed. To this end, a three-dimensional reconstruction 150*a* may be rendered in the display 155 as the movement is performed, or thereafter.

As may be appreciated, the three-dimensional reconstruction 150*a* may not include a video feed of the body 100 performing the movement. Instead, the three-dimensional reconstruction 150*a* includes graphical representations of an electronically generated body performing a movement. In one embodiment, a single three-dimensional reconstruction 150*a* may be shown in the display 155 that mirrors the movements performed by the body 100. In another embodiment, a first three-dimensional reconstruction 150*a* is shown along a second three-dimensional reconstruction 150*b*. For example, the first three-dimensional reconstruction 150*a* may reflect a movement performed by the body 100 while the second three-dimensional reconstruction 150*b* reflects a reconstruction of ideal movement data 142.

To this end, the movement performed by the user may be compared to a movement performed by himself or herself in the past or may be compared to a movement performed by another person, such as a movement performed by a medical professional when assigning a movement or a movement performed by an athlete. The first three-dimensional reconstruction 150*a* may be overlaid on the second three-dimensional reconstruction 150*b*, or vice versa. In other embodiments, the first three-dimensional reconstruction 150*a* and the second three-dimensional reconstruction 150*b* may be shown side by side or one or top of the other in the display 155.

Figure 3:
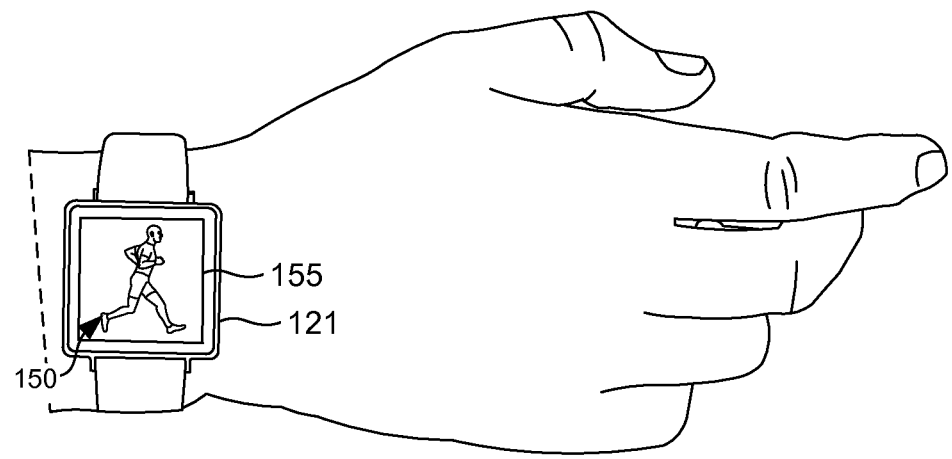
FIG. 3 is a drawing of another client device that may be employed to show a three-dimensional reconstruction of the movement of FIG. 2 according to various embodiments of the present disclosure.

Moving on to FIG. 3, shown is another example of a client device 121 that may be used to display a three-dimensional reconstruction while a movement is performed or thereafter. In one embodiment, the client device 121 may comprise a smartwatch that may show one or more three-dimensional reconstructions 150 in the display 155 that mirrors the movements performed by the body 100.

Figure 4:
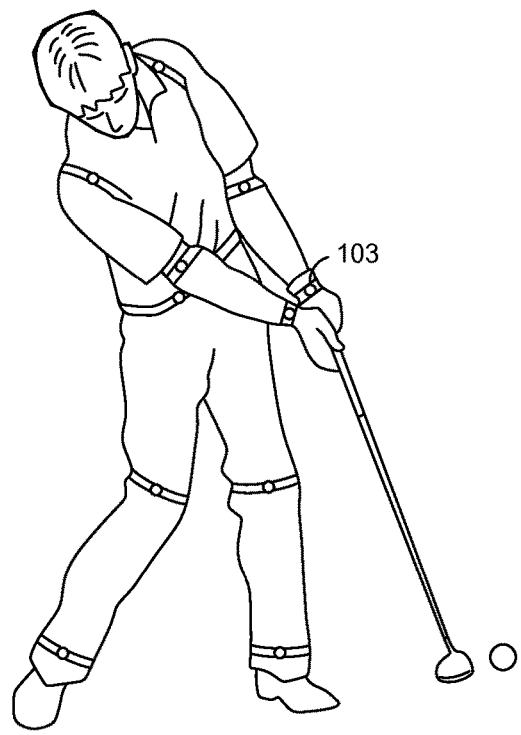
FIG. 4 is a drawing of a body performing a movement where sensor data is collected to generate a three-dimensional reconstruction of the movement in a client device according to various embodiments of the present disclosure.

Turning now to FIG. 4, shown is another drawing of a body 100 performing a movement where sensor data 127 is collected during the movement and communicated to a client device 121. In the non-limiting example of FIG. 4, a golf swing is shown as a movement that may be performed to collect sensor data 127 during the movement. The sampling period to collect sensor data 127 may include a start of the golf swing and an end of the golf swing, as may be appreciated. The sampling rate may include a predefined time interval at which a position and/or orientation is determined and/or obtained from each of the sensor devices 103. For example, a position and/or orientation of the sensor devices 103 may be determined and/or obtained every 0.5 ms, or other suitable time interval.

Figure 5:
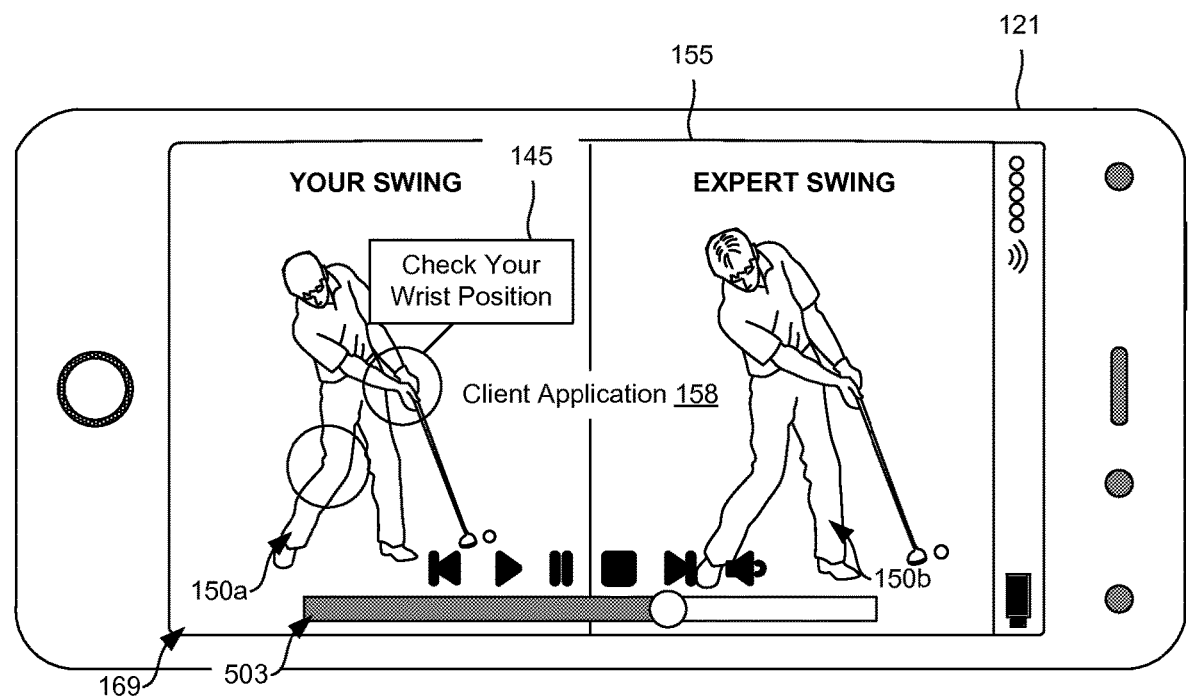
FIG. 5 is a drawing of a client device with two three-dimensional reconstructions that show the movement of FIG. 4 in view of a predefined movement according to various embodiments of the present disclosure.

As shown in FIG. 5, the sensor data 127 collected during the golf swing movement may be used to render a three-dimensional reconstruction 150*a* in near-real-time for encoding in a user interface 169 rendered on a display 155, either as the movement is performed or thereafter. To this end, an athlete is able to view his or her movement to improve technique. In the non-limiting example of FIG. 5, the client application 158 causes a rendering of a first three-dimensional reconstruction 150*a* side-by-side with a second three-dimensional reconstruction 150*b*. The first three-dimensional reconstruction 150*a* may be generated using the sensor data 127 collected during the movement while the second three-dimensional reconstruction 150*b* may be generated using ideal movement data 142.

The client application 158 may be configured to analyze differences between the sensor data 127 collected during the movement and the ideal movement data 142. As noted above, the ideal movement data 142 may reflect sensor data 127 collected by a person who performed an ideal movement. Accordingly, a comparison of sensor data 127 to sensor data 127 is performed. In other words, sensor data 127 collected when a first person performed a movement is compared to sensor data 127 collected when a second person performed the same movement. A position of a sensor device 103 on the first person may be compared to a position of a sensor device 103 on a second person at a same point in time during the movement. For example, given the time t, a position of sensor device 103 for a first person may be compared to a position of a sensor device 103 for a second person and, if the differences in position exceed a predefined threshold, a user of the client device 121 may be notified of the difference.

As a non-limiting example, a wrist position of a professional golfer may be monitored during a golf swing by placing a sensor device 103 at the wrist of the professional golfer. Sensor data 127 is collected from the sensor device 103 during the golf swing to measure a position and orientation of the sensor device 103 (i.e., the wrist) at a predefined sampling rate. This data may be stored as ideal movement data 142. Similarly, a wrist position of an amateur golfer may be monitored during a golf swing by placing a sensor device 103 at the wrist of the amateur golfer. Sensor data 127 is also collected from the sensor device 103 during the golf swing to measure a position and orientation of the sensor device 103 at the same predefined sampling rate. The sensor data 127 collected from the amateur golfer may be compared to that of the professional golfer to identify differences between the positions of the wrist during the golf swing. If a difference in the position exceeds a predefined threshold (e.g., that allows for some degree of error), the user of the client device 121 may be notified. Further, a suggested change 145 may be shown to the user of the client device 121.

A function may be used to obtain a position (and/or orientation) of a sensor device 103 at a given time:

```
float sensor_position(int time, int device_id) {
    // Establish Connection with Database
    $conn = new mysqli([AUTHENTICATION_INFO]);
    // Query Database to Find Position
    $query_string = "SELECT * FROM table WHERE
        device_id='"+$device_id+"' AND time='"+$time+"'";
    $position = $conn->query($query_string);
    // Return Position
    return(position);
}
```

To this end, a first position of a first sensor device 103 (e.g., for the amateur golfer) may be obtained using the function and a second position of a second sensor device 103 (e.g., for the professional golfer). The positions may then be compared. If the first sensor device 103 is within a predefined threshold, the position of the amateur golfer is nearly identical to that of the professional golfer. However, if the first sensor device 103 is not within a predefined threshold, the position of the amateur golfer is not identical to that of the professional golfer. Accordingly, the user of the client device 121 may be notified to adjust his or her wrist position at a given point in time during the swing using a suggested change 145.

In various embodiments, a time at which a position of a first group of sensor devices 103 (e.g., for a first person) is compared to a second group of sensor devices 103 (e.g., for a second person) may be specified by a slider bar 503. As a result, a user of the client device 121 may access and view suggested changes 145 during a frame-by-frame analysis of the movement. Alternatively, the user may view the movement in its entirety at a real-time play speed to see suggested changes 145 at different times during playback of the movement. In some embodiments, the playback of the movement may be sped up or slowed down.

Further, the client application 158 may be executed in the client device 121 and may store the sensor data 127 for later access and/or communicate the sensor data 127 over the network 133 to be stored remotely by the computing environment 124. The client application 158 may be configured to generate the three-dimensional reconstructions 150 or the computing environment 124 may remotely generate the three-dimensional reconstructions 150 and provide them to the client device 121 for rendering in the display 155.

As may be appreciated, a three-dimensional reconstruction 150 may not include a video feed of the body 100 performing the movement. Instead, the three-dimensional reconstructions 150 include graphical representations of an electronically generated body performing a movement. In one embodiment, a single three-dimensional reconstruction 150 may be shown in the display 155 that mirrors the movements performed by the body 100. In another embodiment, a first three-dimensional reconstruction 150a is shown along with a second three-dimensional reconstruction 150b. For example, the first three-dimensional reconstruction 150a may reflect a movement performed by the body 100 while the second three-dimensional reconstruction 150b reflects a reconstruction of ideal movement data 142. To this end, the movement performed by the user may be compared to a movement performed by himself or herself in the past or may be compared to a movement performed by another person, such as a movement (assigned performed by a medical professional when assigning a movement or a movement performed by an athlete.

Figure 6:
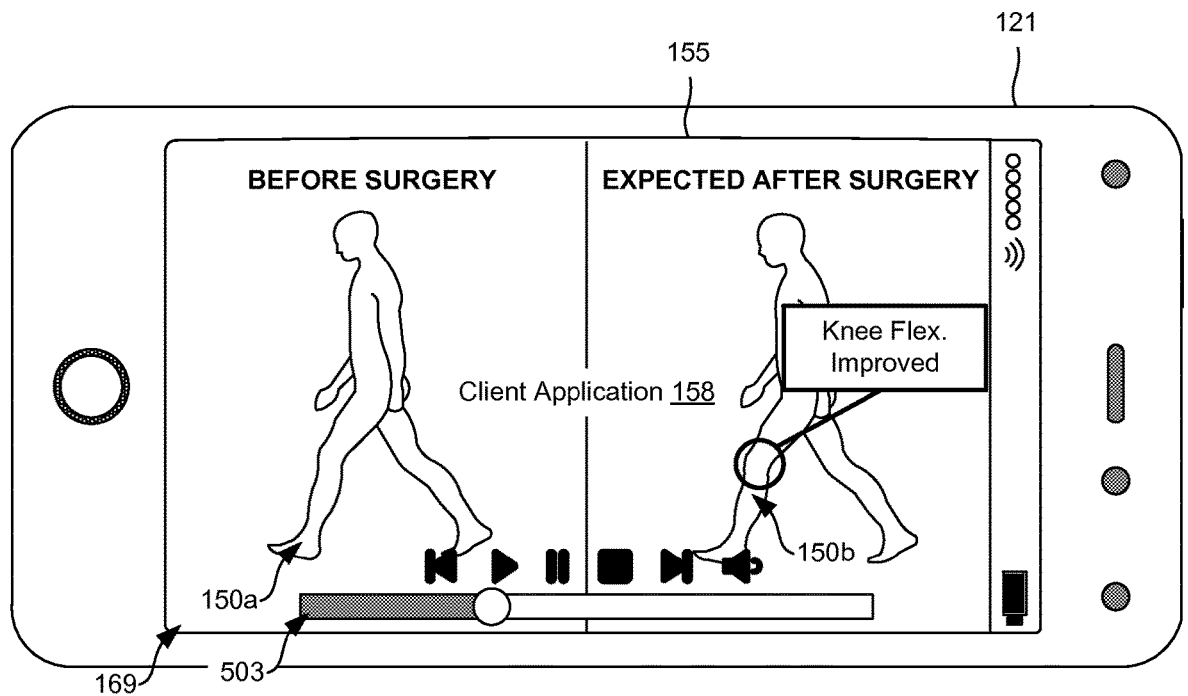
FIGS. 6-7 are drawings of a client device with two three-dimensional reconstructions that show a movement performed or being performed in view of another predefined movement according to various embodiments of the present disclosure.

Moving on to FIG. 6, shown is a drawing of a client device 121 used to render three-dimensional reconstructions 150a . . . 150b. In various circumstances, a person may have a surgery and, as a result of the surgery, a movement performed by the person is changed. For example, a person might walk, run, or perform other exercises differently after a knee surgery.

Accordingly, in various embodiments, the client application 158 may be executed to compare sensor data 127 collected for a patient during a movement (e.g., gait, running, or other movement) to sensor data 127 collected by a representative patient to show expected differences between the movements. For example, a notification may be presented in the client application 158 that indicates that knee flexibility will be improved.

Figure 7:
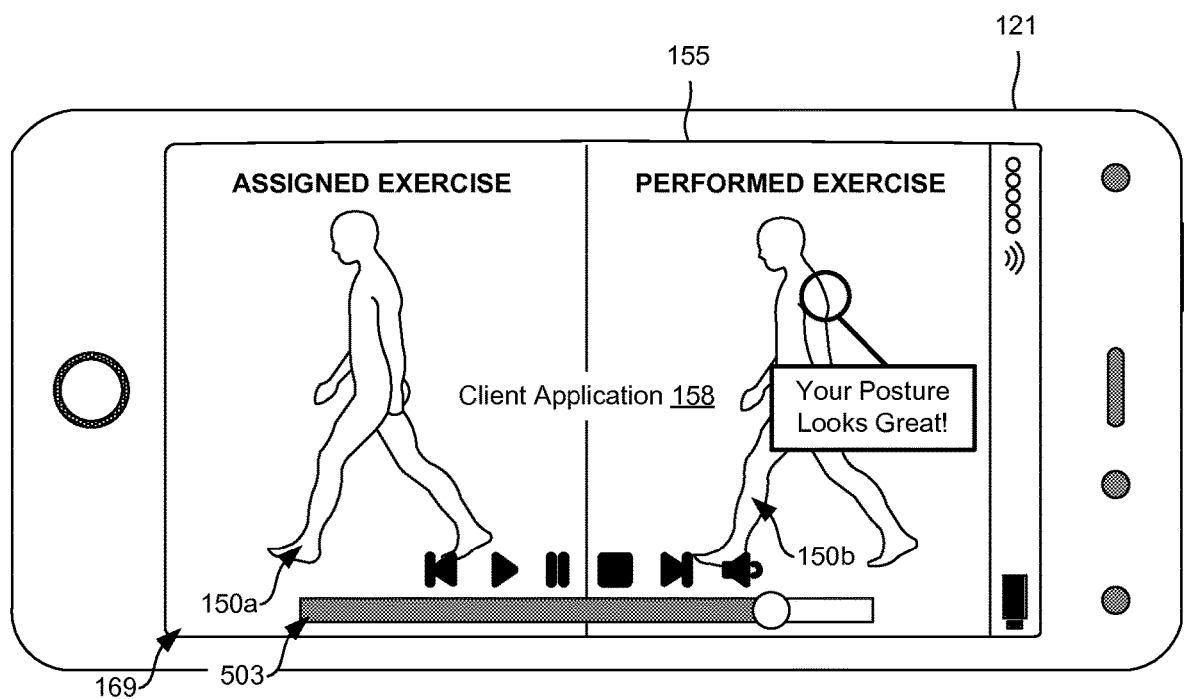

Similarly, in FIG. 7, the client application 158 may be executed to compare sensor data 127 collected by a medical professional to remotely assign a movement to a patient. The sensor data 127 may be collected by the medical professional wearing sensor devices 103 or the sensor data 127 may be accessed from a database of previously analyzed movements. For example, a medical professional may use sensor data 127 collected from another patient to assign a movement to a patient.

Either the patient and/or the medical professional may use a client device 121 to access three-dimensional reconstructions 150 generated using the sensor data 127. As a result, the exercise performed by a patient may be compared to the assigned exercise to see if the patient can conform his or her movement to that of the assigned exercise. The client application 158 may detect differences between the two sets of sensor data 127 and communicate the differences to the patient and/or the medical profession, for example, by rendering a suitable notification in the user interface 169. Additionally, notifications from the doctor to patient, or vice versa, may be rendered in the display 155, for example, to direct the patient how to improve or to notify the patient that he or she is performing well.

Figure 8:
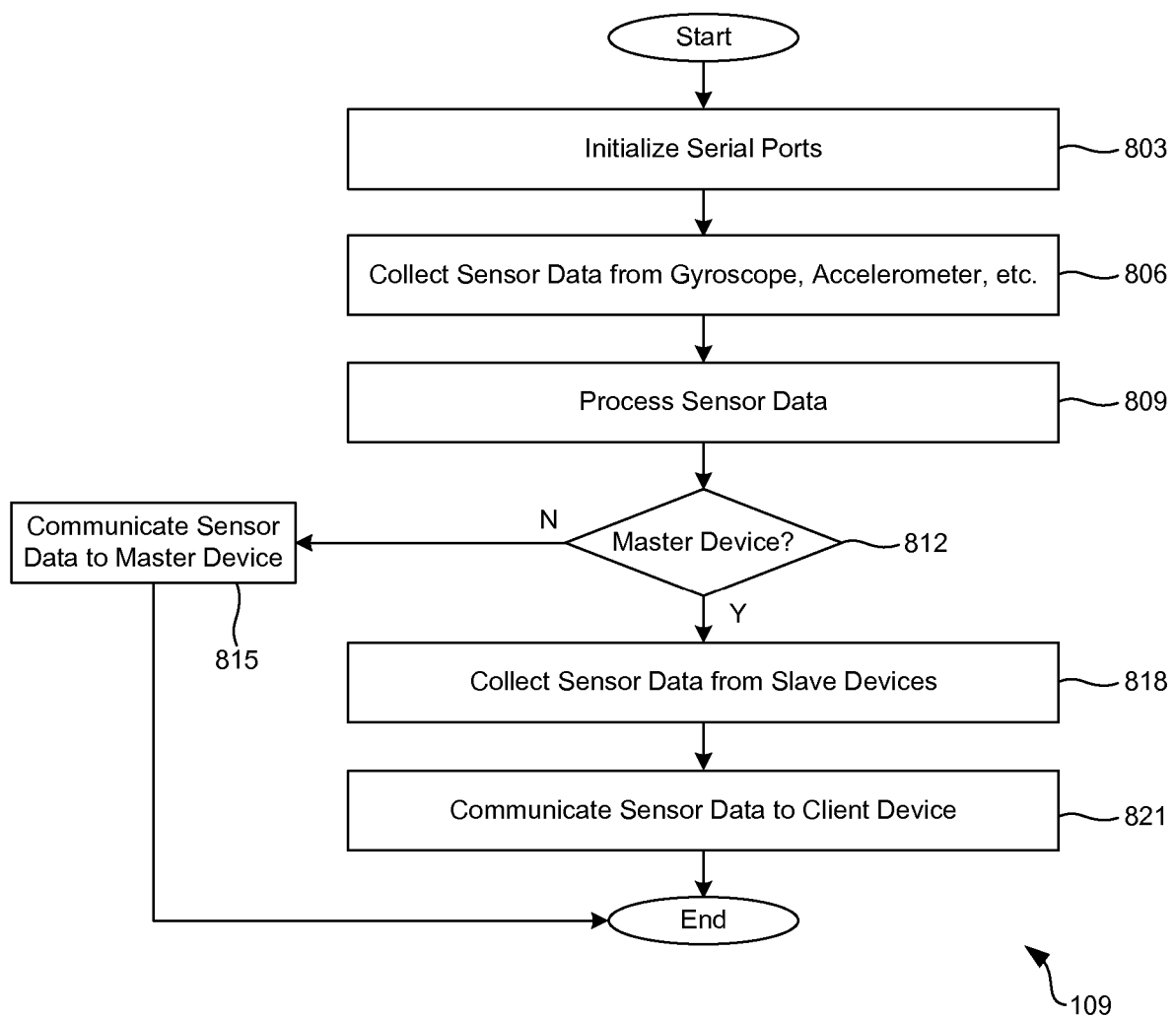
FIG. 8 is a flowchart illustrating one example of functionality implemented as portions of the sensor devices of FIG. 1 according to various embodiments of the present disclosure.

Referring next to FIG. 8, shown is a flowchart that provides one example of the operation of a portion of the microcontroller 109 of the sensor device 103 according to various embodiments. It is understood that the flowchart of FIG. 8 provides merely an example of the many different types of functional arrangements that may be employed to implement the operation of the portion of the microcontroller 109 as described herein. As an alternative, the flowchart of FIG. 8 may be viewed as depicting an example of elements of a method implemented by a microprocessor application executable by a hardware processor according to one or more embodiments.

Beginning with 803, the microcontroller 109 initializes its serial ports or other communication interface, if necessary. For example, some microcontrollers 109 communicate with components of the microcontroller 109, or other circuitry, using serial port processing. In one embodiment, the microcontroller 109 communicates with the one or more accelerometers 112, gyroscopes 115, magnetometers 117, etc., using serial ports. To this end, in some embodiments, a microprocessor application may perform a function call to a library to initialize the serial ports for communication.

Next, in 806, sensor data 127 is collected from the one or more gyroscopes 115, accelerometers 112, magnetometers 117, etc. In embodiments where the sensor device 103 is capable of 6DoF, sensor data 127 is collected from three gyroscopes 115 and three accelerometers 112. In other embodiments, the sensor device may be capable of 9DoF or more.

Next, in 809, the microcontroller 109 may process the sensor data 127, for example, to determine an orientation and position of the sensor device 103 in a three-dimensional space. In alternative embodiments, raw sensor data 127a may be communicated to the client device 121 to determine the orientation or position remotely. If the microcontroller 109 locally processes the sensor data, in some embodiments, the microcontroller 109 ultimately may determine four quaternions from sensor data 127 collected from an inertial measurement unit (IMU) that may comprise the gyroscopes 115, the accelerometers 112, and/or other devices. The output data from the sensors could be quaternion vectors or a three-dimensional position (x, y, z) with an angle of rotation to establish a rotational matrix. Each quaternion may include a four-element vector that can be used to encode a rotation in a three-dimensional coordinate system. As may be appreciated, the quaternions may be used to calculate orientation and position (or location) in a three-dimensional coordinate system and utilized as suitable input to graphics code for three-dimensional reconstruction.

In 812, a determination may be made whether the sensor device 103 on which the microcontroller 109 is embedded is a master sensor device. As noted above, in some embodiments, at least one of the sensor devices 103 in a group of sensor devices 103 may be dedicated as a "master" sensor device 103, where other ones of the sensor devices 103 are "slave" sensor devices 103. Accordingly, if the sensor device is not designated as a master sensor device 103, the process proceeds to 815 where the sensor data 127 (as processed) is communicated to a master sensor device 103. Thereafter, the process proceeds to completion.

Referring back to 812, if the sensor device 103 on which the microcontroller 109 is embedded is designated as the master sensor device the process proceeds to 818 where sensor data 127 is collected from the slave sensor devices 103. Next, in 821, the sensor data 127 collected by the components of the master and slave sensor devices 103 is communicated to a client device 121, such as a smartphone, a tablet computing device, a laptop computing device, a smartwatch, or other computing device.

As noted above, the sensor devices 103 include a communication module 118, such as a network interface component capable of sending and receiving data to other devices. To this end, the communication module 118 may include a Bluetooth® module, a Bluetooth® low-energy module, a ZigBee® module, a Wi-Fi module, a near field communication (NFC) module, or other suitable module. Using the communication module 118, the microcontroller 109 may cause transmission of the sensor data 127 from the sensor device 103 to a computing device, such as the client device 121. In embodiments where the communication module 118 includes a Wi-Fi module, the sensor data 127 may be communicated directly to the computing environment 124 using a wireless network.

Turning now to FIG. 9, shown is an example of pseudocode that may be used to configure a microprocessor application executable by a hardware processor of a microcontroller 109 onboard a sensor device 103. The pseudocode reflects an example of an algorithm that causes performance of some functions of the sensor device 103 (or the microcontroller 109 of the sensor device 103) as described throughout the present disclosure. The pseudocode may not reflect a particular software language, but may describe functions, function calls, variable definitions, or other actions that, if implemented in one or more software languages, configure the microcontroller 109 to perform the functions described herein.

Notably, the pseudocode describes including applicable libraries and creating a variable for device identifier data and quaternion data, which may be embodied as an array of floats. A library included in the application may comprise classes, functions, or other calls that permit hardware control. For example, an object for "SensorDevice" may be created where .Initialize( ) is a function that initializes the sensor device.

In a setup routine, serial ports or other communication interfaces may be initialized, if necessary. For example, a microcontroller 109 may be manufactured to communicate with other devices or circuitry using serial port processing. The microprocessor application may perform a function call to a suitable library to initialize the serial ports for communication. A wait is performed to allow the serial ports to initialize.

Thereafter, a loop routine is performed to collect data from components of the sensor device 103, such as the IMU. For example, a sensor identifier may be accessed from the IMU and stored at location [0] in array q, a first quaternion may be accessed from the IMU and stored at location [1] in array q, and so forth. The array q is then communicated over the serial port. In one example, the serial port allows the data to be communicated to the communication module 118, which then communicates the data to the client device 121. The loop continues to repeat until the application is exited or terminated based on a predefined condition (e.g., powering off the device, disabling data collection, or other condition).

Figure 10:
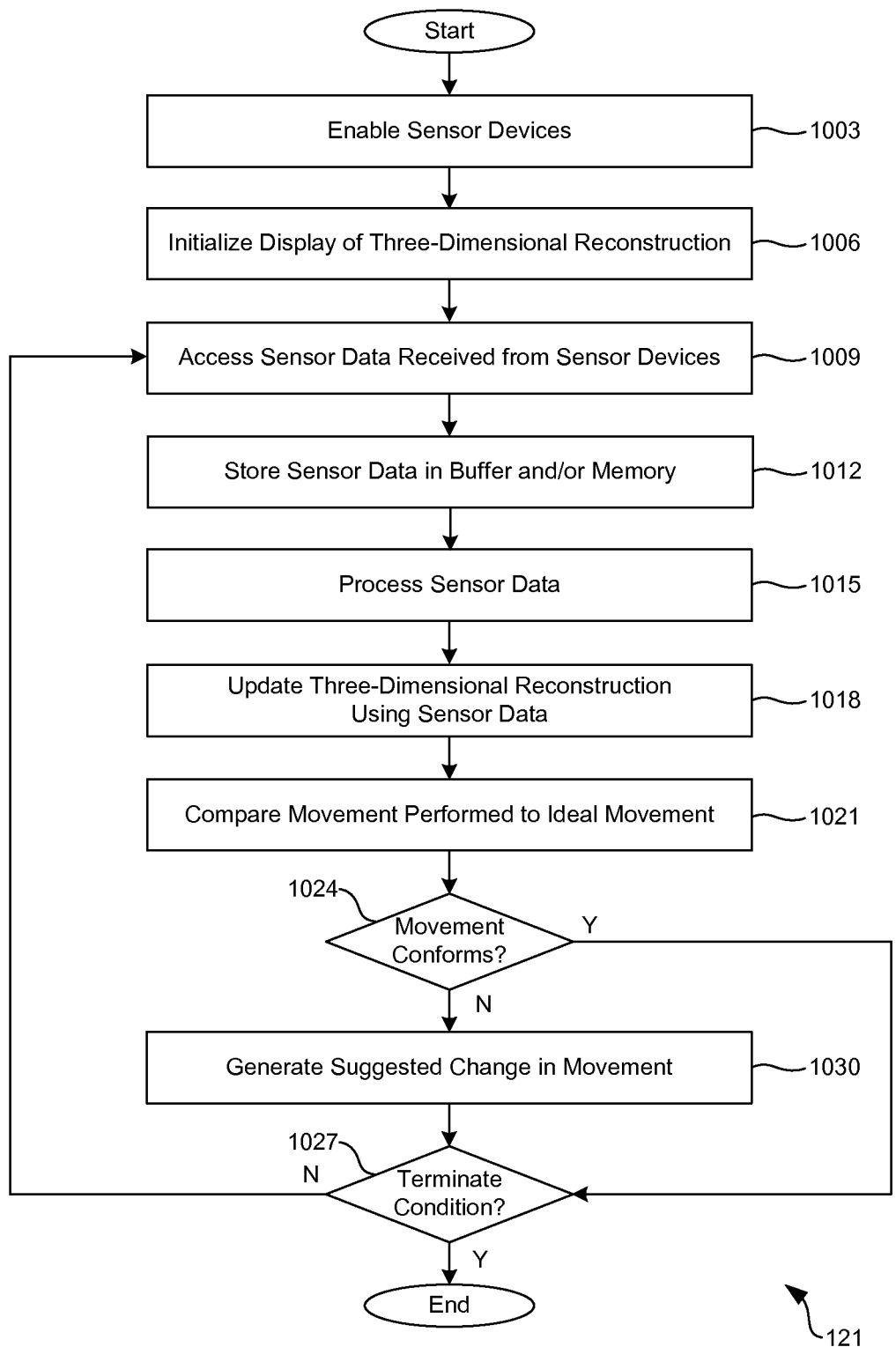
FIG. 10 is a flowchart illustrating one example of functionality implemented as portions of the client device of FIG. 1 according to various embodiments of the present disclosure.

Moving on to FIG. 10, shown is a flowchart that provides one example of the operation of a portion of the client device 121 according to various embodiments. It is understood that the flowchart of FIG. 10 provides merely an example of the many different types of functional arrangements that may be employed to implement the operation of the portion of the client device 121 as described herein. As an alternative, the flowchart of FIG. 10 may be viewed as depicting an example of elements of a method implemented by the client application 158 executable by a hardware processor according to one or more embodiments.

As noted above, one or more sensor devices 103 can be positioned on a body 100 of a person, animal, humanoid, animoid, or other moveable body to accurately track movement where more sensor devices 103 can produce more granularities in movement detection. Each sensor device 103 may be coupled to a band 106 or other attachment that secures the sensor device 103 to a position on the body 100. Additionally, each sensor device 103 may include circuitry that measures a position of the portion of the body 100 to which the band is secured during a movement performed by the portion of the body 100. As shown in FIG. 1, each sensor device 103 may comprise a microcontroller 109, an accelerometer 112, a gyroscope 115, a magnetometer 117, a communication module 118, and/or other components as may be appreciated. As at least one of the sensor devices 103 is configured to communicate with a client device 121, the client application 158 can process sensor data 127 and generate user interfaces 169 that include three-dimensional reconstructions 150 of performed movements.

The sensor devices 103 may be placed in accordance with a predefined arrangement stored in memory (e.g., the data store 136), such that a computing device can correlate each of the sensor devices 103 to a respective position of a body 100. In one embodiment, assuming the body 100 is that of a person or a humanoid, a first sensor device 103a may be positioned at a first shoulder of the body 100; a second sensor device 103b may be positioned at a second shoulder of the body 100; a third sensor device 103c may be positioned at a first elbow of the body 100; a fourth sensor device 103d may be positioned at a second elbow of the body 100; a fifth sensor device 103e may be positioned at a first wrist of the body 100; a sixth sensor device 103f may be positioned at a second wrist of the body 100; a seventh sensor device 103g may be positioned at a first knee of the body 100; an eighth sensor device 103h may be positioned at a second knee of the body 100; a ninth sensor device 103i may be positioned at a first ankle of the body 100; a tenth sensor device 103j may be positioned at a second ankle of the body 100; an eleventh sensor device 103k may be positioned at a first side of hips of the body 100; and a twelfth sensor device 103l may be positioned at a second side of hips of the body 100.

Beginning with 1003, the client device 121 enables the sensor devices 103 to collect sensor data 127. In one embodiment, the client device 121 sends a suitable control signal to each sensor device 103 that causes the sensor device 103 to start collecting sensor data 127. In another embodiment, the client device 121 sends a suitable control signal to a master sensor device 103, which then sends suitable control signals to slave sensor devices 103 that causes the sensor devices 103 to start collecting sensor data 127.

Next, in 1006, the client device 121 initializes the display of one or more three-dimensional reconstructions 150. To this end, a client application 158 or service may be executed that utilizes graphic libraries to eventually render a three-dimensional reconstruction 150 of a body 100, where the three-dimensional reconstruction 150 is updated in near-real-time to mirror movements performed by the body 100 wearing the sensor devices 103 using the three-dimensional reconstruction 150.

In 1009, sensor data 127 is received from the sensor devices 103, for example, using Bluetooth®, ZigBee®, Wi-Fi, or other suitable communication medium. As noted above, the sensor devices 103 may include a communication module 118, such as a Bluetooth® module, a Bluetooth® low-energy module, a ZigBee® module, an NFC module, a Wi-Fi module, or other suitable communication module 118 capable of communicating with another computing device. In various embodiments, the sensor devices 103, or a master sensor device 103, may be configured to communicate the sensor data 127 to a client device 121 asynchronously. The client device 121 may include a hardware processor, an operating system, and one or more applications (hereinafter client application or client applications) capable of execution on the client device by the hardware processor. In various embodiments, the client application 158 is configured to access the sensor data 127 measured by the sensor devices. The sensor data 127 may include the position of the portion of the body 100 during the movement performed, or other data collection during the movement.

In 1012, the sensor data 127 collected from the sensor devices 103 may be stored in a buffer or in local memory. To this end, in some embodiments, the sensor data 127 may be stored in a database (e.g., structured query language (SQL) database or SQL-Lite database) of the data store 136 in association with a time the movement was performed.

Next, in 1015, the sensor data 127 may be processed to determine a position and/or orientation of each of the sensors devices 103 based on the sensor data 127 received from each of the sensor devices 103. For example, sensor data 127 received from a sensor device 103 at a shoulder may be processed to identify a position or orientation of the sensor device 103 at the shoulder, and so forth. In some embodiments, the sensor data 127 is processed to monitor changes in a position of a corresponding sensor device 103, such as changes in left movement, right movement, upwards movements, downwards movement, forward movement, backwards movement, pitch, roll, and yaw.

Using the processed sensor data 127, in 1018, the three-dimensional reconstruction 150 is generated, updated, and/or rendered in a display 155 of the client device 121. In one embodiment, to update the three-dimensional reconstruction 150, a programmatic function call or application programming interface (API) call is performed to provide a graphics library with an updated position and/or orientation of the corresponding portion of the body 100.

Further, in some embodiments, the client device 121 (e.g., via the client application 158) may be configured to determine whether a movement performed by a body 100, having the sensor devices 103 coupled thereon, conforms to an ideal movement, such as a movement assigned by a medical professional, a movement performed by a coach or athlete, or other predefined movement. Accordingly, in 1021, the movement performed by the body 100 having the sensor devices 103 coupled thereon is compared to ideal movement data 142 representative of an ideal movement.

The ideal movement data 142 may reflect sensor data 127 collected by a person who performed an ideal movement. As a result, a comparison of sensor data 127 to sensor data 127 is performed. In other words, sensor data 127 collected when a first person performed a movement is compared to sensor data 127 collected when a second person performed the same movement. A position of a sensor device 103 on the first person may be compared to a position of a sensor device 103 on a second person during at a same point in time during the movement. For example, given the time t, a position of sensor device 103 for a first person may be compared to a position of a sensor device 103 for a second person and, if the differences in position exceed a predefined threshold, a user of the client device 121 may be notified of the difference. As a non-limiting example, given t, a query is performed to obtain data from the ideal movement data 142.

SELECT * FROM ideal_movement_data_table WHERE sensor_id='[SENSORID]' AND time='[TIME t]'"

Similarly, given the same time t, a query is performed to obtain data from the sensor devices 103 performed by the body 100.

SELECT * FROM sensor_data_table WHERE sensor_id='[SENSORID]' AND time='[TIME t]'"

As a non-limiting example, Table 2 describes the data from the query to the "ideal_movement_data_table" and the query to the "sensor_data_table:"

TABLE 2

Sample Results from Two Queries to Compare Sensor Positions

| Sensor_ID | Sensor_Pos | User_ID | Time | Q1 . . . Q4 |
|---|---|---|---|---|
| 012333457 | Left Wrist | 042857 | t | [Q_VALUES] |
| 489611342 | Left Wrist | 054621 | t | [Q_VALUES] |

The row for "sensor_id"=01233457 contains information associated with an ideal movement data 142 and the row for "sensor_id"=489611342 contains information associated with sensor data 127 obtained from a movement performed, for example, by a current wearer of the sensor device 103. The values of the two rows stored as columns under "pos"

may be compared to determine whether a first movement conforms to a second movement, or vice versa. The comparison may include accounting for error using a predefined threshold, as may be appreciated.

In 1024, a determination is made whether a first movement (e.g., a movement performed by a wearer of the sensor devices 103) conforms to a second movement (e.g., ideal movement data 142). If a first movement is within a predefined threshold of a second movement, no action may be taken and the process may proceed to 1027. However, in some embodiments, a notification may be generated for rendering on a display 155 that indicates that the movement performed by a user conforms with ideal movement data 142 (e.g., "Good job, your movement is correct!").

Referring back to 1024, if the first movement does not conform to the second movement (e.g., the first position is not within a predefined threshold of the second movement), the process proceeds to 1030 where a suggested change 145 in the movement may be generated for rendering in the display 155. The suggested change 145 may include, for example, a change in the position of the portion of the body 100 where a particular sensor device 103 is attached that, if performed as suggested, would conform to the ideal movement data 142. As may be appreciated, the user of the client device 121 may then attempt to perform a subsequent movement based on the suggested change 145 to conform to an ideal movement.

The process then proceeds to 1027 where a determination is made whether a terminate condition has been identified. In some embodiments, a terminate condition may occur after a predefined amount of time, after a complete movement has been performed (e.g., a complete pitch motion, a complete jump shot, or a complete golf swing), when a user closes the client application 158, or when a user pauses the collection of sensor data 127 in the client application 158. If a terminate condition is not identified, the process reverts back to 1009 to continue accessing collected sensor data 127, for example, to continue updating the three-dimensional reconstruction 150 and to continue generating suggested changes 145 in movement. If a terminate condition is identified, however, the process may proceed to completion.

Referring next to FIG. 11, shown is an example of pseudocode that may be used to configure the client application 158 ultimately executable by a hardware processor of the client device 121. The pseudocode reflects an example of an algorithm that causes performance of some functions of the client device 121 as described throughout the present disclosure. The pseudocode may not reflect a particular software language, but may describe functions, function calls, variable definitions, or other actions that, if implemented in one or more software languages, configure the client device 121 to perform the functions described herein.

Notably, the pseudocode describes including applicable libraries to allow access to particular libraries that may be needed to interface with particular peripherals of the client device 121, such as the display 155, the serial ports or other communication modules, memory, etc. Various data objects (e.g., JavaScript Object Notation (JSON) data objects), screen dimensions, serial ports, and variables may be initialized. Further, an object model may be initialized to create a three-dimensional reconstruction 150 using a suitable graphics library. In some embodiments, node.js library can be used to generate or modify a three-dimensional reconstruction.

A setup routine may be performed that establishes a size of a graphical user interface (e.g., user interface 169), loads images to be used in object models (e.g., three-dimensional reconstructions), scales the images to be used in the object models, defines a user interface area (e.g., a bounding box), instantiates serial ports, and stores data obtained over the serial ports (e.g., sensor data 127 obtained from one or more of the sensor devices 103) in a buffer.

A serial event routine may be performed that identifies which one of the sensor devices 103 transmitted sensor data 127 received by the client device 121 (e.g., using a unique sensor identifier). The sensor data 127 may be stored in association with the sensor device 103 that communicated the sensor data 127 as well as a time the sensor data 127 was obtained. A call to a quaternion processing routine may be called to process quaternions received from a particular sensor device 103.

The quaternion processing routine may be called to create a string of characters of the sensor data 127 received from the particular sensor device 103. As the sensor data 127 is received from the sensor device 103 as a stream of characters, the characters may be stored in a string data object and parsed using a "split( )" function. The quaternions obtained from the particular sensor device 103 may be casted into floats to allow the client application 158 to perform subsequent processing which might not be available were the quaternions stored as strings of characters. An axis is identified from the quaternions as well as an angle of rotation. Using the axis and the angle of rotation, a function call may be performed to a "Draw( ) routine" that generates and/or updates a three-dimensional reconstruction 150.

The "Draw( ) routine" may include a loop to constantly update the three-dimensional reconstruction 150 until a terminate condition is identifier. The routine may push orientation matrices that update applicable portions of the body 100 as well as rotate the orientation matrices by the determined angle and axis of rotation.

Figure 12:
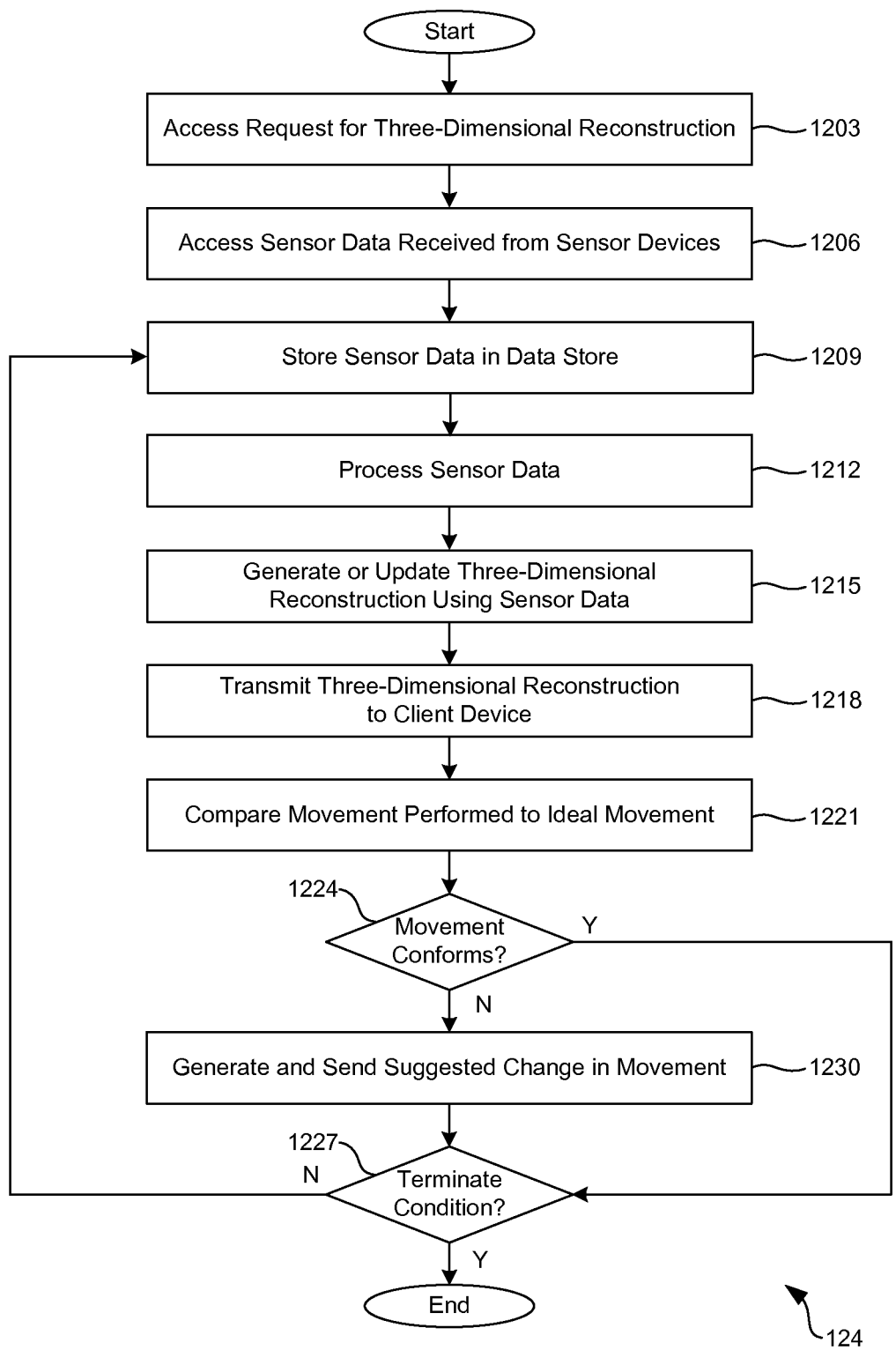
FIG. 12 is a flowchart illustrating one example of functionality implemented as portions of the computing environment of FIG. 1 according to various embodiments of the present disclosure.

Moving on to FIG. 12, shown is a flowchart that provides one example of the operation of a portion of the computing environment 124 according to various embodiments. It is understood that the flowchart of FIG. 12 provides merely an example of the many different types of functional arrangements that may be employed to implement the operation of the portion of the client device 121 as described herein. As an alternative, the flowchart of FIG. 12 may be viewed as depicting an example of elements of a method implemented by the data processing application 139 executable by a hardware processor of the computing environment 124 according to one or more embodiments.

In various embodiments, the functions performed by the client application 158 can be offloaded for processing by the computing environment 124. Beginning with 1203, the computing environment 124 accesses a request received from the client device 121 for a three-dimensional reconstruction 150. In some embodiments, the request may include sensor data 127 received by the client device 121 from the sensor devices 103. Accordingly, in 1206, the computing environment 124 accesses sensor data 127 received by the computing environment 124 from, for example, the client device 121 and the sensor devices 103.

As noted above, the sensor devices 103 may include a communication module 118, such as a Bluetooth® module, a Bluetooth® low-energy module, a ZigBee® module, an NFC module, a Wi-Fi module, or other suitable communication module 118 capable of communicating with another computing device. In various embodiments, the sensor devices 103, or a master sensor device 103, may be configured to communicate the sensor data 127 to the computing environment 124 asynchronously. The data processing application 139 may be configured to access the sensor data 127 measured by the sensor devices 103. The sensor data 127 may include the position of the portion of the body 100 during the movement performed, or other data collected during the movement.

In 1209, the sensor data 127 collected from the client device 121 or the sensor devices 103 may be stored in a buffer or in the data store 136. To this end, in some embodiments, the sensor data 127 may be stored in a database (e.g., SQL database or SQL-Lite database) of the data store 136 in association with a time the movement was performed.

Next, in 1212, the sensor data 127 may be processed to determine a position and/or orientation of each of the sensors devices 103 based on the sensor data 127 received from each of the sensor devices 103. For example, sensor data 127 received from a sensor device 103 at a shoulder may be processed to identify a position or orientation of the sensor device 103 at the shoulder, and so forth. In some embodiments, the sensor data 127 is processed to monitor changes in a position of a corresponding sensor device 103, such as changes in left movement, right movement, upwards movements, downwards movement, forward movement, backwards movement, pitch, roll, and yaw.

Using the processed sensor data 127, in 1218, the three-dimensional reconstruction 150 is generated or updated and is transmitted to the client device 121 over the network 133 for rendering in the display 155. In one embodiment, to update the three-dimensional reconstruction 150, a programmatic function call or API call is performed to provide a graphics library with an updated position and/or orientation of the corresponding portion of the body 100.

Further, in some embodiments, the computing environment 124 (e.g., via the data processing application 139) may be configured to determine whether a movement performed by a body 100, having the sensor devices 103 coupled thereon, conforms to an ideal movement, such as a movement assigned by a medical professional, a movement performed by a coach or athlete, or other predefined movement. Accordingly, in 1221, the movement performed by the body 100 having the sensor devices 103 coupled thereon is compared to ideal movement data 142 representative of an ideal movement.

The ideal movement data 142 may reflect sensor data 127 collected by a person who performed an ideal movement. As a result, a comparison of sensor data 127 to sensor data 127 is performed. In other words, sensor data 127 collected when a first person performed a movement is compared to sensor data 127 collected when a second person performed the same movement. A position of a sensor device 103 on the first person may be compared to a position of a sensor device 103 on a second person during at a same point in time during the movement.

In 1224, a determination is made whether a first movement (e.g., a movement performed by a wearer of the sensor devices 103) conforms to a second movement (e.g., ideal movement data 142). If a first movement is within a predefined threshold of a second movement, no action may be taken and the process may proceed to 1227. However, in some embodiments, a notification may be generated for rendering on a display 155 that indicates that the movement performed by a user conforms with ideal movement data 142 (e.g., "Good job, your movement is correct!").

Referring back to 1224, if the first movement does not conform to the second movement (e.g., the first position is not within a predefined threshold of the second movement), the process proceeds to 1230 where a suggested change 145 in the movement may be generated for rendering in the display 155. The suggested change 145 may include, for example, a change in the position of the portion of the body 100 where a particular sensor device 103 is attached that, if performed as suggested, would conform to the ideal movement data 142. As may be appreciated, the user of the client device 121 may then attempt to perform a subsequent movement based on the suggested change 145 to conform to an ideal movement.

The process then proceeds to 1227 where a determination is made whether a terminate condition has been identified. In some embodiments, a terminate condition may occur after a predefined amount of time, after a complete movement has been performed (e.g., a complete pitch motion, a complete jump shot, or a complete golf swing), when a user closes the client application 158, or when a user pauses the collection of sensor data 127 in the client application 158. If a terminate condition is not identified, the process reverts back to 1009 to continue accessing collected sensor data 127, for example, to continue updating the three-dimensional reconstruction 150 and to continue generating suggested changes 145 in movement. If a terminate condition is identified, however, the process may proceed to completion.

Figure 13:
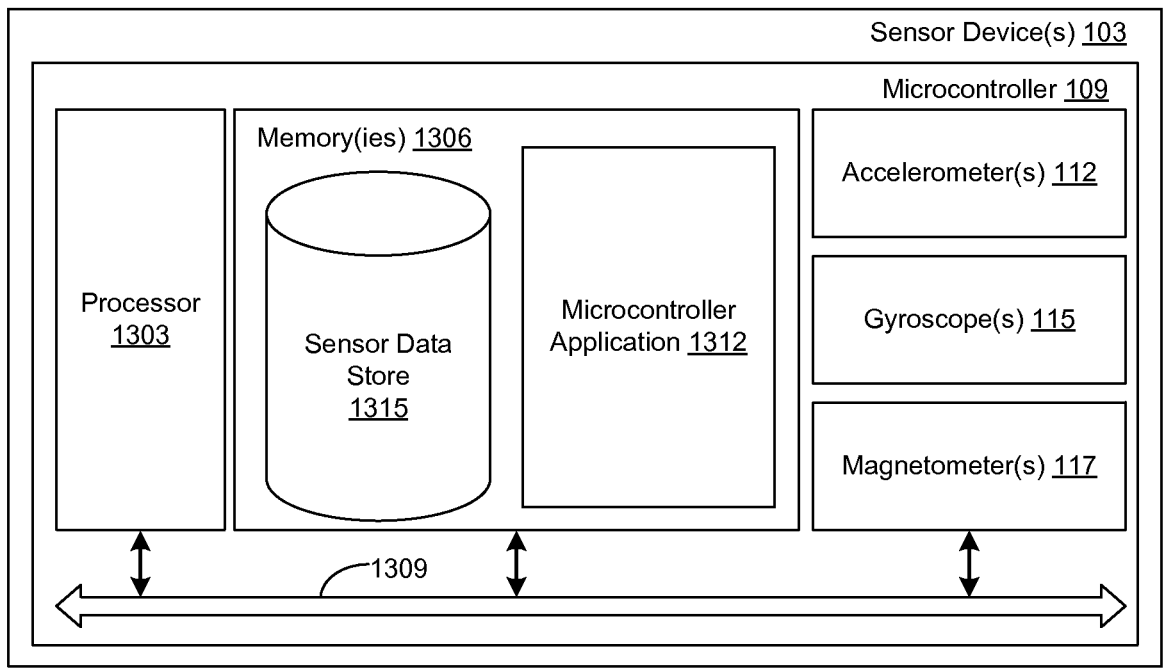
FIG. 13 is a schematic block diagram that provides one example illustration of a sensor device of employed in the networked environment of FIG. 1 according to various embodiments of the present disclosure.

With reference to FIG. 13, shown is a schematic block diagram of a sensor device 103 according to an embodiment of the present disclosure. The computing environment 124 includes one or more microcontroller 109. Each microcontroller 109 includes at least one processor circuit, for example, having a processor 1303 and a memory 1306, both of which are coupled to a local interface 1309. The local interface 1309 may comprise, for example, a data bus with an accompanying address/control bus or other bus structure as can be appreciated. The sensor device 103 may further comprise one or more accelerometers 112, gyroscopes 115, magnetometers 117, and/or other components.

Stored in the memory 1306 are both data and several components that are executable by the processor 1303. In particular, stored in the memory 1306 and executable by the processor 1303 is a microcontroller application 1312, and potentially other applications. Also stored in the memory 1306 may be a sensor data store 1315 and other data. In addition, an operating system may be stored in the memory 1306 and executable by the processor 1303.

Figure 14:
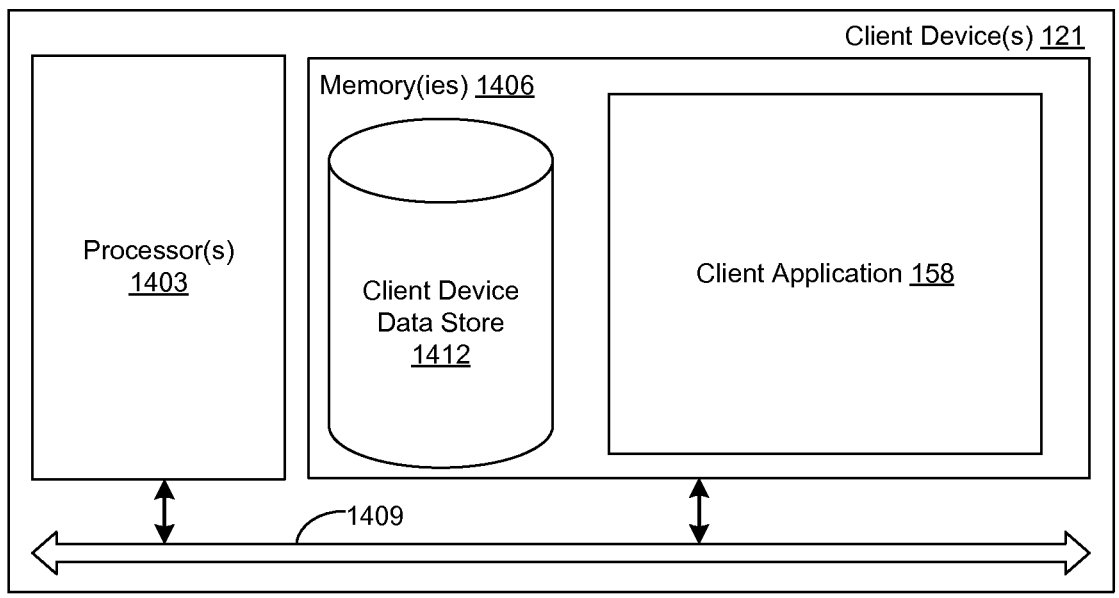
FIG. 14 is a schematic block diagram that provides one example illustration of a client device of employed in the networked environment of FIG. 1 according to various embodiments of the present disclosure.

Turning now to FIG. 14, shown is a schematic block diagram of the client device 121 according to an embodiment of the present disclosure. The client device 121 includes one or more computing devices. Each computing device includes at least one processor circuit, for example, having a processor 1403 and a memory 1406, both of which are coupled to a local interface 1409. To this end, each computing device may comprise, for example, a mobile computing device, such as a smartphone, a tablet, a smartwatch, or other similar device. The local interface 1409 may comprise, for example, a data bus with an accompanying address/control bus or other bus structure as can be appreciated.

Stored in the memory 1406 are both data and several components that are executable by the processor 1403. In particular, stored in the memory 1406 and executable by the processor 1403 are the client application 158, and potentially other applications. Also stored in the memory 1406 may be a client device data store 1412 and other data. In addition, an operating system may be stored in the memory 1406 and executable by the processor 1403.

Figure 15:
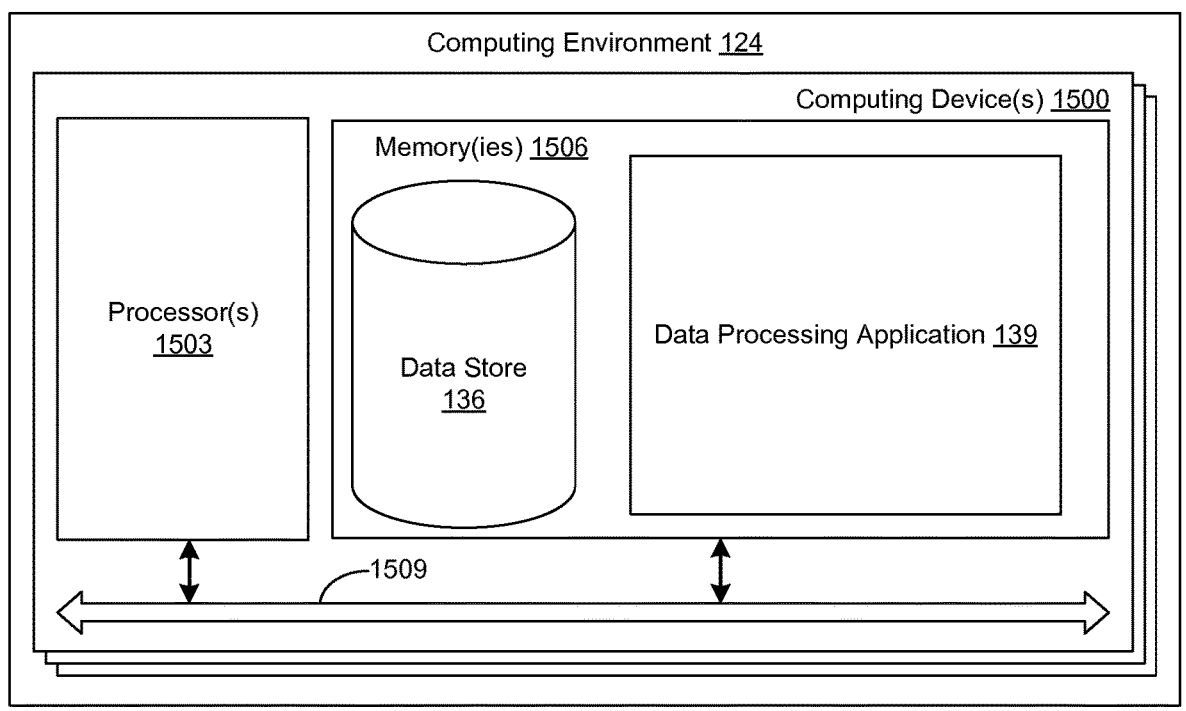
FIG. 15 is a schematic block diagram that provides one example illustration of a computing environment employed in the networked environment of FIG. 1 according to various embodiments of the present disclosure.

With reference to FIG. 15, shown is a schematic block diagram of the computing environment 124 according to an embodiment of the present disclosure. The computing environment 124 includes one or more computing devices 1500.

Each computing device 1500 includes at least one processor circuit, for example, having a processor 1503 and a memory 1506, both of which are coupled to a local interface 1509. To this end, each computing device 1500 may comprise, for example, at least one server computer or like device. The local interface 1509 may comprise, for example, a data bus with an accompanying address/control bus or other bus structure as can be appreciated. It is understood that there may be other applications that are stored in the memory 1506 and are executable by the processor 1503 as can be appreciated.

Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1506 and are executable by the processor 1503. In this respect, the term "executable" means a program file that is in a form that can ultimately be run by the processor 1503. Examples of executable programs may be, for example, a compiled program that can be translated into machine code in a format that can be loaded into a random access portion of the memory 1506 and run by the processor 1503, source code that may be expressed in proper format such as object code that is capable of being loaded into a random access portion of the memory 1506 and executed by the processor 1503, or source code that may be interpreted by another executable program to generate instructions in a random access portion of the memory 1506 to be executed by the processor 1503, etc. An executable program may be stored in any portion or component of the memory 1506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1506 is defined herein as including both volatile and nonvolatile memory and data storage components. Volatile components are those that do not retain data values upon loss of power. Nonvolatile components are those that retain data upon a loss of power. Thus, the memory 1506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1503 may represent multiple processors 1503 and/or multiple processor cores and the memory 1506 may represent multiple memories 1506 that operate in parallel processing circuits, respectively. In such a case, the local interface 1509 may be an appropriate network that facilitates communication between any two of the multiple processors 1503, between any processor 1503 and any of the memories 1506, or between any two of the memories 1506, etc. The local interface 1509 may comprise additional systems designed to coordinate this communication, including, for example, performing load balancing. The processor 1503 may be of electrical or of some other available construction.

Although the microcontroller application 1312, the client application 158, the data processing application 139, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 8, 10, and 12 show the functionality and operation of an implementation of portions of the microcontroller application 1312, the client application 158, and the data processing application 139. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1503 in a computer system or other system. The machine code may be converted from the source code, etc. If embodied in hardware, each block may represent a circuit or a number of interconnected circuits to implement the specified logical function(s).

Although the flowcharts of FIGS. 8, 10, and 12 show a specific order of execution, it is understood that the order of execution may differ from that which is depicted. For example, the order of execution of two or more blocks may be scrambled relative to the order shown. Also, two or more blocks shown in succession in FIGS. 8, 10, and 12 may be executed concurrently or with partial concurrence. Further, in some embodiments, one or more of the blocks shown in FIGS. 8, 10, and 12 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the microcontroller application 1312, the client application 158, the data processing application 139, that comprises software or code can be embodied in any non-transitory computer-readable medium for use by or in connection with an instruction execution system such as, for example, a processor 1503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the microcontroller application 1312, the client application 158, the data processing application 139, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 124. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for telemedicine between a patient and a remotely-located medical professional, comprising:
   a plurality of sensor devices in data communication with a client device, the client device comprising at least one hardware processor, wherein individual ones of the sensor devices comprise:
   a band to secure a respective one of the sensor devices to a portion of a body of a patient, the respective one of the sensor devices being secured to the portion of the body of the patient based at least in part on a predefined arrangement of sensor devices stored in a memory of the client device;
   circuitry comprising an accelerometer and a gyroscope that measures a position of the portion of the body of the patient to which the band is secured during a movement performed by the portion of the body of the patient; and
   the client device; and
   an application executed in the client device, the application comprising program instructions that, when executed, direct the client device to:
   establish a telemedicine session between the client device and a remote computing device operated by a medical professional located remotely from the patient;
   render a first three-dimensional graphical model of the body of the patient for viewing in a display accessible to the client device;
   receive from the remote computing device an indication of a movement to be performed, the movement to be performed being assigned by the medical professional;
   access sensor data measured by the plurality of sensor devices, the sensor data comprising the position of the portion of the body of the patient during the movement;
   update the first three-dimensional graphical model of the body of the patient in the display using the sensor data to further comprise the movement;
   receive, from the remote computing device, ideal sensor data comprising a position of a portion of a body of the medical professional during an ideal body movement performed by the portion of the body of the medical professional, the ideal sensor data being generated by at least one sensor device secured to the portion of the body of the medical professional during the ideal body movement and stored in a data store of the remote computing device;
   render a second three-dimensional graphical model of the body of the medical professional in the display based at least in part on the ideal sensor data, the second three-dimensional graphical model comprising the ideal body movement;
   determine whether the movement conforms to the ideal body movement based at least in part on a difference between a position of at least one sensor device of the plurality of sensor devices from the sensor data and a position of the at least one sensor device secured to the portion of the body of the medical professional from the ideal sensor data at a given time exceeding a predefined threshold;
   in response to the movement not conforming to the ideal body movement, identify a suggested change in the movement that conforms to the ideal body movement;
   send a communication to the remote computing device, the communication comprising an indication that the movement does not conform to the ideal body movement; and
   render an indication of the suggested change in the movement in the display.

2. The system of claim 1, wherein the circuitry that measures the position of the portion of the body of the patient to which the band is secured further comprises a magnetometer.

3. The system of claim 2, wherein at least one of the sensor devices comprises a master sensor device and other ones of the sensor devices comprise a plurality of slave sensor devices, the master sensor device being configured to obtain the sensor data from the slave sensor devices and communicate the sensor data to the client device via a communication module.

4. The system of claim 1, wherein the program instructions, when executed, further direct the client device to communicate the sensor data to a server computing device over a network for remote processing.

5. The system of claim 1, wherein the sensor devices are configured to communicate the sensor data to the client device asynchronously.

6. A system for telemedicine between a patient and a remotely-located medical professional comprising:
   a plurality of sensor devices in data communication with a client device, the client device comprising at least one hardware processor, wherein individual ones of the sensor devices comprise:
      a band to secure a respective one of the sensor devices to a portion of a body of a patient, the respective one of the sensor devices being secured to the portion of the body of the patient based at least in part on a predefined arrangement of sensor devices stored in a memory of the client device;
      circuitry comprising an accelerometer and a gyroscope that measures a position of the portion of the body of the patient to which the band is secured during a movement performed by the portion of the body of the patient; and
   an application executed in a remote computing device in data communication with the client device over a network, the application comprising logic that:
      establishes a telemedicine session between the client device and a remote computing device operated by a medical professional located remotely from the patient;
      generates a first three-dimensional graphical model of the body of the patient;
      accesses sensor data measured by the plurality of sensor devices received from the client device over the network, the sensor data comprising the position of the portion of the body of the patient during the movement;
      updates the first three-dimensional graphical model of the body of the patient using the sensor data to further comprise the movement;
      receives, from the remote computing device operated by the medical professional, ideal sensor data comprising a position of a portion of a body of the medical professional during an ideal body movement, the ideal sensor data being generated by at least one sensor device secured to the portion of the body of the medical professional and stored in a data store of the remote computing device;
      generates a second three-dimensional graphical model of the body of the medical professional based at least in part on the ideal sensor data, the second three-dimensional graphical model comprising the ideal body movement;
      determines whether the movement conforms to the ideal body movement based at least in part on a difference between a position of at least one sensor device of the plurality of sensor devices from the sensor data and a position of the at least one sensor device secured to the portion of the body of the medical professional from the ideal sensor data at a given time exceeding a predefined threshold;
      in response to the movement not conforming to the ideal body movement, identifies a suggested change in the movement that conforms to the ideal body movement;
      sends a communication to the remote computing device, the communication comprising an indication that the movement does not conform to the ideal body movement; and
      causes transmission of the first three-dimensional graphical model of the body of the patient, the second three-dimensional graphical model, and the suggested change in the movement to the remote computing device for rendering in a display.

7. The system of claim 6, wherein the circuitry that measures the position of the portion of the body of the patient to which the band is secured further comprises a magnetometer.

8. The system of claim 6, wherein at least one of the sensor devices comprises a master sensor device and other ones of the sensor devices comprising a plurality of slave sensor devices, the master sensor device being configured to obtain the sensor data from the slave sensor devices and communicate the sensor data to the client device via a communication module.

9. The system of claim 6, wherein the application further comprises logic that communicates the sensor data to a server computing device over a network for remote processing.

10. The system of claim 6, wherein the sensor devices are configured to communicate the sensor data to the client device asynchronously.

11. A computer-implemented method for telemedicine between a patient and a remotely-located medical professional, comprising:
   establishing, by at least one computing device comprising at least one hardware processor, a telemedicine session between the at least one computing device and a remote computing device operated by a medical professional located remotely from a patient operating the at least one computing device;
   generating, by the at least one computing device, a first three-dimensional graphical model of a body of the patient;
   receiving, by the at least one computing device, an indication of a movement to be performed from the remote computing device, the movement to be performed being assigned by the medical professional;
   accessing, by the at least one computing device, sensor data obtained by a plurality of sensor devices, wherein individual ones of the sensor devices comprise:
      a band to secure a respective one of the sensor devices to a portion of a body of the patient, the respective one of the sensor devices being secured to the portion of the body of the patient based at least in part on a predefined arrangement of sensor devices stored in a memory of the at least one computing device; and
      circuitry comprising an accelerometer and a gyroscope that measures a position of the portion of the body of the patient to which the band is secured during a movement performed by the portion of the body of the patient;
   updating, by the at least one computing device, the first three-dimensional graphical model of the body of the patient using the sensor data to further comprise the movement performed;

receiving, by the at least one computing device, predefined sensor data from the remote computing device, ideal sensor data comprising a position of a portion of a body of the medical professional during an ideal body movement performed by the portion of the body of the medical professional, the predefined sensor data being generated by at least one sensor device secured to the portion of the body of the medical professional and stored in a data store of the remote computing device;

generating, by the at least one computing device, a second three-dimensional graphical model of the body of the medical professional based at least in part on the ideal sensor data, the second three-dimensional graphical model comprising the ideal body movement;

determining whether the movement conforms to the ideal body movement based at least in part on a difference between a position of at least one sensor device of the plurality of sensor devices from the sensor data and a position of the at least one sensor device secured to the portion of the body of the medical professional from the predefined sensor data at a given time exceeding a predefined threshold;

in response to the movement not conforming to the ideal body movement, identifying a suggested change in the movement that conforms to the ideal body movement;

sending, by the at least one computing device, a communication to the remote computing device, the communication comprising an indication that the movement does not conform to the ideal body movement; and causing the first three-dimensional graphical model of the body, the second three-dimensional graphical model, and the suggested change in the movement to be rendered in a display.

12. The method of claim 11, wherein the circuitry that measures the position of the portion of the body of the patient to which the band is secured further comprises a magnetometer.

13. The method of claim 12, wherein at least one of the sensor devices comprises a master sensor device and other ones of the sensor devices comprising a plurality of slave sensor devices, the master sensor device being configured to obtain the sensor data from the slave sensor devices and communicate the sensor data to a client device via a communication module.

14. The method of claim 13, wherein the communication module further comprises a BLUETOOTH® module, a BLUETOOTH® low-energy module, a ZIGBEE® module, or a near field communication (NFC) module.

15. The method of claim 11, further comprising causing, by the at least one computing device, transmission of the sensor data to a server computing device over a network for remote processing.

16. The method of claim 11, wherein the predefined arrangement further comprises: a first one of the sensor devices being located at a first shoulder of the body; a second one of the sensor devices being located at a second shoulder of the body; a third one of the sensor devices being located at a first elbow of the body; a fourth one of the sensor devices being located at a second elbow of the body; a fifth one of the sensor devices being located at a first wrist of the body; a sixth one of the sensor devices being located at a second wrist of the body; a seventh one of the sensor devices being located at a first knee of the body; an eighth one of the sensor devices being located at a second knee of the body; a ninth one of the sensor devices being located at a first ankle of the body; a tenth one of the sensor devices being located at a second ankle of the body; an eleventh one of the sensor devices being located at a first side of hips of the body; and a twelfth one of the sensor devices being located at a second side of hips of the body.

17. The system of claim 6, wherein the accelerometer is a first accelerometer, and the circuitry that measures the position of the portion of the body of the patient to which the band is secured further comprises a second accelerometer and a third accelerometer.

18. The system of claim 6, wherein the gyroscope is a first gyroscope, and the circuitry that measures the position of the portion of the body of the patient to which the band is secured further comprises a second gyroscope and a third gyroscope.

19. The system of claim 1, wherein the first three-dimensional graphical model of the body of the patient and the second three-dimensional graphical model of the body of the medical professional are rendered side-by-side in the display.

20. The system of claim 1, wherein the second three-dimensional graphical model of the body of the medical professional is rendered as an overlay on the first three-dimensional graphical model of the body of the patient in the display.

* * * * *